(12) United States Patent
Ekambaram et al.

(10) Patent No.: US 10,585,728 B2
(45) Date of Patent: Mar. 10, 2020

(54) TRANSFORMING SENSOR DATA STREAMED TO APPLICATIONS

(71) Applicant: International Business Machines Corporation, Armonk, NY (US)

(72) Inventors: Vijay Ekambaram, Bangalore (IN); Nitin Gupta, New Delhi (IN); Pratyush Kumar, Guindy (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/823,784

(22) Filed: Nov. 28, 2017

(65) Prior Publication Data

US 2019/0163544 A1 May 30, 2019

(51) Int. Cl.
*G06F 9/54* (2006.01)
*H04L 29/06* (2006.01)
(Continued)

(52) U.S. Cl.
CPC ............ *G06F 9/546* (2013.01); *G06N 20/00* (2019.01); *H04L 63/0428* (2013.01);
(Continued)

(58) Field of Classification Search
None
See application file for complete search history.

(56) References Cited

U.S. PATENT DOCUMENTS 7,890,530 B2   2/2011   Bilger et al.
9,600,676 B1 *  3/2017   Farmer
(Continued)

FOREIGN PATENT DOCUMENTS

WO   2006031988 A2   3/2006
WO   WO2016124549 A1 *  2/2016

OTHER PUBLICATIONS

Chakraborty et al., "ipShield: a framework for enforcing context-aware privacy." 11th USENIX Symposium on Networked Systems Design and Implementation (NSDI 14). USENIX Association, 2014. 15 pages.

(Continued)

*Primary Examiner* — Syed A Roni
(74) *Attorney, Agent, or Firm* — Ryan, Mason & Lewis, LLP

(57) ABSTRACT

Methods, systems and computer program products for securing access to sensor data are provided herein. A computer-implemented method includes obtaining sensor data from a user device indicative of user activity, detecting for a first time period activities of the user, generating a transformation key for the first time period, transforming sensor data obtained during the first time period utilizing the transformation key, and streaming the transformed sensor data to a plurality of applications. The method also includes determining whether respective ones of the applications have permitted activities that match the detected activities of the user and, responsive to matching the permitted activities of a given application to the detected activities of the user, providing the transformation key to the given application. The method may include identifying applications associated with the user device, extracting descriptions of the applications, and utilizing the descriptions to generate sets of permitted activities for the applications.

19 Claims, 16 Drawing Sheets

(51) Int. Cl.
*H04L 29/08* (2006.01)
*G06N 20/00* (2019.01)
(52) U.S. Cl.
CPC .............. *H04L 67/10* (2013.01); *H04L 67/12* (2013.01); *H04L 67/22* (2013.01)

(56) References Cited

U.S. PATENT DOCUMENTS

| | | | |
|---|---|---|---|
| 2012/0250863 | A1 | 10/2012 | Bukshpun et al. |
| 2013/0110131 | A1 | 5/2013 | Madhani et al. |
| 2013/0174211 | A1 | 7/2013 | Aad et al. |
| 2014/0196158 | A1 | 7/2014 | Buck |
| 2016/0034707 | A1* | 2/2016 | Sahu |
| 2016/0094558 | A1 | 3/2016 | Lal et al. |
| 2017/0140174 | A1 | 5/2017 | Lacey et al. |
| 2018/0035297 | A1* | 2/2018 | Cronin |
| 2018/0191687 | A1 | 7/2018 | Munafo |

OTHER PUBLICATIONS

Almuhimedi et al., "Your Location has been Shared 5,398 Times! A Field Study on Mobile App Privacy Nudging." CHI 15 Proceedings of the 33rd Annual ACM Conference on Human Factors in Computing Systems. Apr. 18-23, 2015, 10 pages.
Balebako et al., ""Little Brothers Watching You:" Raising Awareness of Data Leaks on Smartphones." Symposium on Usable Privacy and Security (SOUPS) 2013, Jul. 24-26, 2013, Newcastle, UK. 14 pages.
Hornyack et al., ""These Aren't the Droids You're Looking for" Retrofitting Android to Protect Data from Imperious Applications." CCS '11 Proceedings of the 18th ACM Conference on Computer and Communications Security, Chicago, Illinois, USA—Oct. 17-21, 2011. 12 pages.
"Advanced Permission Manager," Google Play Store. https://play.google.com/store/apps/details?id=com.gmail.heagoo.pmaster, Nov. 22, 2017. 3 pages.
"APK Permission Remover." https://www.apk4fun.com/apps/com.gmail.heagoo.apkpermremover/, Nov. 22, 2017. 2 pages.
Boyles et al., "Privacy and Data Management on Mobile Devices." Pew Internet & American Life Project, Sep. 5, 2012. 19 pages.
Felt et al., "Android Permissions: User Attention, Comprehension, and Behavior." Symposium on Usable Privacy and Security (SOUPS) 2012, Jul. 11-13, 2012, Washington, DC, USA. 14 pages.
"Permission Manager—App ops," Google Play Store. https://play.google.com/store/apps/details?id=com.ovmobile.appopslauncher, Nov. 22, 2017. 3 pages.
"X Privacy Installer", Google Play Store. https://play.google.com/store/apps/details?id=biz.bokhorst.xprivacy.installer, Nov. 22, 2017. 3 pages.
"Permission Explorer," Google Play Store. https://play.google.com/store/apps/details?id=com.carlocriniti.android.permission_explorer, Nov. 22, 2017. 3 pages.
"MyPermissions Privacy Cleaner," Google Play Store. https://play.google.com/store/apps/details?id=com.mypermissions.mypermissions, Nov. 22, 2017. 3 pages.
Gorla et al., "Checking App Behavior Against App Descriptions." ICSE '14 Proceedings of the 36th International Conference on Software Engineering, May 31-Jun. 7, 2014, Hyderabad, India. 11 pages.
"AFWall+ (Android Firewall +)," Google Play Store. https://play.google.com/store/apps/details?id=dev.ukanth.ufirewall&hl=en, Nov. 22, 2017. 3 pages.
"Mobiwol: NoRoot Firewall," Google Play Store. https://play.google.com/store/apps/details?id=com.netspark.firewall&hl=en, Nov. 22, 2017. 3 pages.
"LostNet NoRoot Firewall," Google Play Store. https://play.google.com/store/apps/details?id=com.lostnet.fw.free&hl=en, Nov. 22, 2017. 3 pages.
"Android Developers: Storage Options." https://developer.android.com/guide/topics/data/data-storage.html#filesInternal, Nov. 22, 2017. 12 pages.
Kapadia et al., "Opportunistic Sensing: Security Challenges for the New Paradigm," COMSNETS'09 Proceedings of the First International Conference on Communication Systems and Networks, Bangalore, India—Jan. 5-10, 2009. 10 pages.
Kapadia et al., "Virtual Walls: Protecting Digital Privacy in Pervasive Environments," PERVASIVE'07 Proceedings of the 5th International Conference on Pervasive Computing, Toronto, Canada—May 13-16, 2007. 18 pages.

* cited by examiner

TRANSFORMING SENSOR DATA STREAMED TO APPLICATIONS

FIELD

The present invention relates to data security, and more specifically, to techniques for securing access to sensor data.

BACKGROUND

Mobile and wearable devices are widely used today. Such mobile and wearable devices typically include one or more sensors configured to capture activity of users of the mobile and wearable devices. As mobile and wearable devices increase in usage, sensors are becoming ubiquitous in capturing various types of user activity.

SUMMARY

Embodiments of the invention provide techniques for securing access to sensor data, including sensor data indicative of activity of a user of a mobile or wearable device.

In one embodiment, an exemplary computer-implemented method comprises steps of obtaining sensor data from at least one user device, the sensor data being indicative of activity of a user of the at least one user device, detecting, for a first time period, one or more activities of the user of the at least one user device utilizing the obtained sensor data, generating at least one transformation key, associating the at least one transformation key with the first time period, transforming the sensor data obtained during the first time period utilizing the at least one transformation key, and streaming the transformed sensor data to a plurality of applications. The method also comprises the step of determining, for a given one of the plurality of applications, whether permitted activities for the given application match the detected one or more activities of the user of the at least one user device during the first time period. The method further comprises the step of providing the at least one transformation key for the first time period to the given application responsive to determining that the permitted activities for the given application match the detected one or more activities of the user the at least one user device during the first time period. The steps are carried out by at least one computing device.

In another embodiment, an exemplary computer-implemented method comprises steps of identifying one or more applications associated with at least one user device, extracting descriptions of the identified one or more applications, and generating a set of permitted activities for a given one of the identified one or more applications based on the extracted description of the given application, the set of permitted activities comprising activities for which the given application is to be permitted access to sensor data of the user device. The method further comprises the step of utilizing the set of permitted activities to determine whether to provide at least one transformation key to the given application during a given time period, the at least one transformation key being utilizable by the given application for obtaining original sensor data from transformed sensor data streamed to the given application during the given time period. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for securing access to sensor data. However, it is to be understood that embodiments of the invention are not limited to the illustrative methods, systems and devices but instead are more broadly applicable to other suitable methods, systems and devices.

As discussed above, with the rise and prevalence of use of mobile computing devices such as smartphones, tablets, wearable devices, etc., sensors are becoming ubiquitous, capturing various activity of the users of such devices. Numerous applications on such devices utilize sensor data, such as Global Positioning System (GPS) sensor data, accelerometer data, gyroscope sensor data, Wi-Fi sensor data, etc. GPS data may be used for navigation and other location-based service applications. Accelerometer and gyroscope data, and more generally motion sensor data, may be used for health applications, fitness applications, driving applications, etc. Wi-Fi data may be used for location detection in applications. Numerous other applications may utilize various types of sensor data to provide various services. Although sensors on such devices enable useful functionality in various applications, the potential leak of sensor data may expose sensitive or confidential information. Intelligent algorithms for detecting patterns from sensor data can be used to understand user information and user activities. Such detected patterns of user information and/or user activities may also be sensitive or confidential.

Consider, as an example, a wearable device embodied as a smartwatch. A smartwatch can be configured to capture various user activity modalities. Motion sensors in the smartwatch can detect various types of user activity, including day to day activities such as sleeping, eating, walking, brushing, driving, etc. Sensors may also capture information such as user input of sensitive information (e.g., passwords, Automated Teller Machine (ATM) Personal Identification Numbers (PINs), sensitive text, etc.), determining whether a user is currently using the smartwatch or another device such as a smartphone, handwritten air signing, etc.

Figure 1:
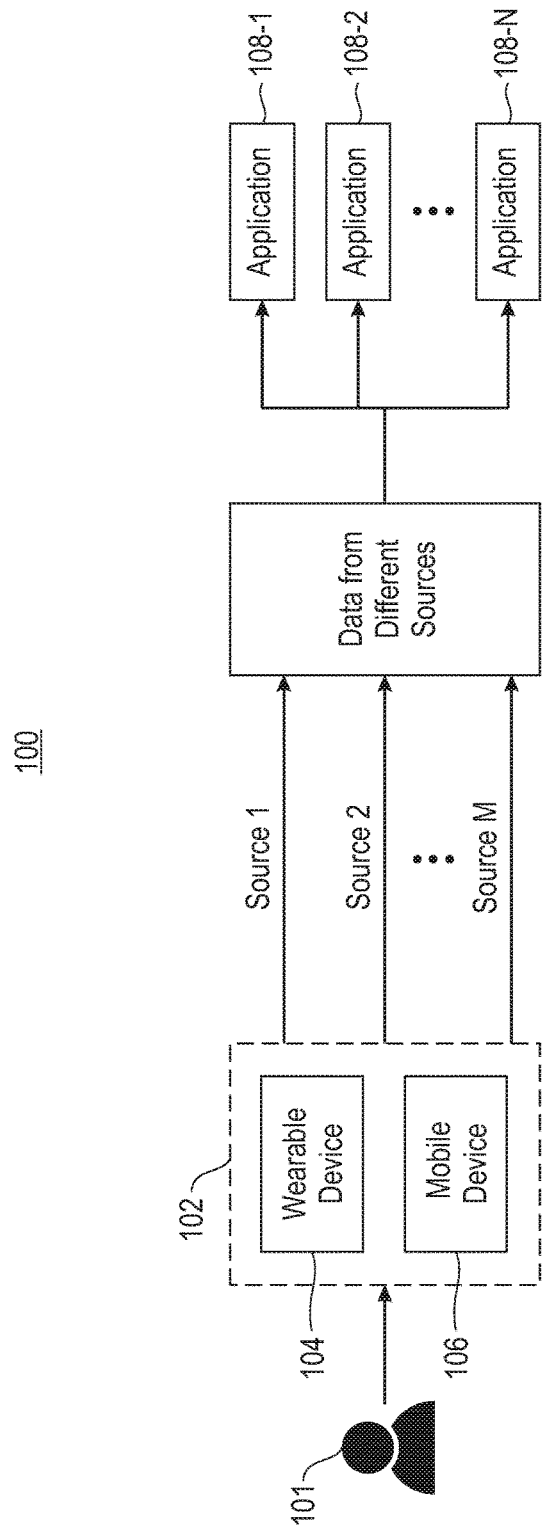
FIG. 1 depicts a system for applications accessing sensor data on mobile and wearable devices, according to an exemplary embodiment of the present invention.

FIG. 1 depicts a system 100 of applications accessing sensor data. As shown, a user 101 has access to user device 102. The user device 102 is assumed to comprise at least one of a wearable device 104 and a mobile device 106. The wearable device 104 may be a smartwatch, smart glasses or other augmented reality (AR) device, fitness tracker, medical monitoring device, smart clothing, etc. The mobile device 106 may be a smartphone, personal digital assistant (PDA), tablet, laptop, etc. The wearable device 104 and mobile device 106, collectively referred to as user device 102, comprise a number of sensors or other data sources 1, 2, ..., M. The data from such data sources are provided to applications 108-1, 108-2, ..., 108-N, collectively referred to herein as applications 108. One or more of the applications 108 may run on or otherwise be implemented on the wearable device 104 or mobile device 106. One or more of the applications may also or alternatively be web-based applications accessible to one or both of the wearable device 104 and mobile device 106. Examples of applications include fitness tracking applications, sleeping or sleep monitoring applications, cycling or run tracking applications, shopping applications, social media applications, etc.

Figure 2:
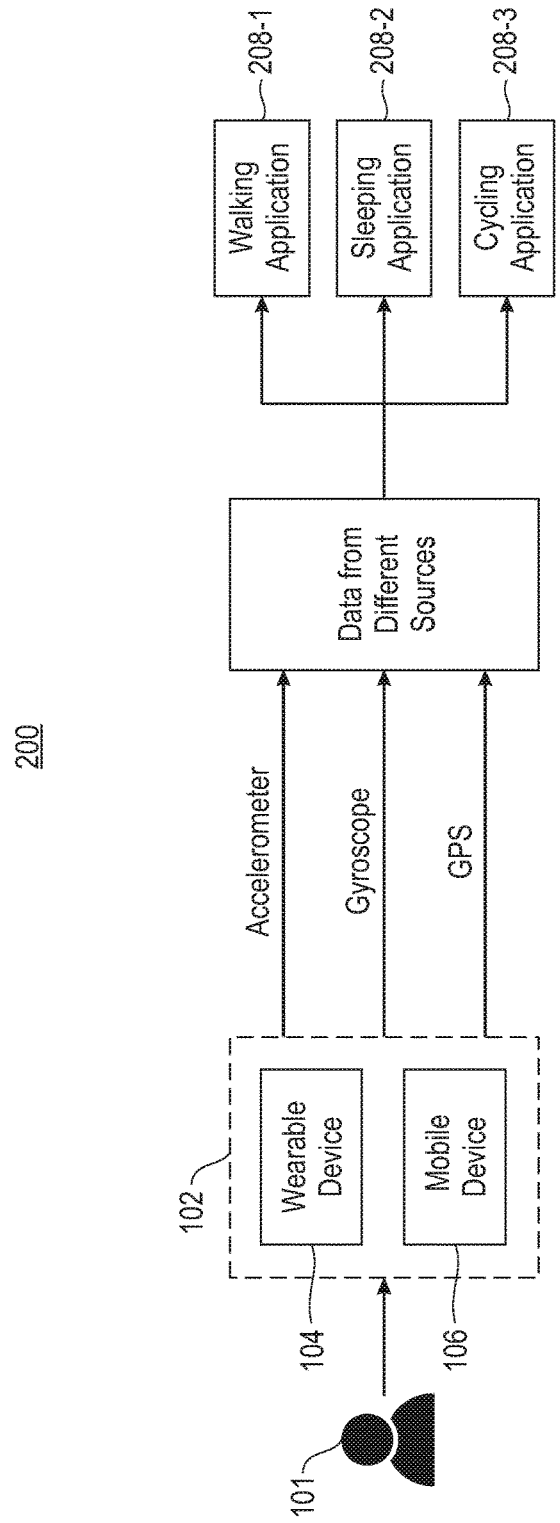
FIG. 2 depicts another system for application accessing sensor data on mobile and wearable devices, according to an exemplary embodiment of the present invention.

FIG. 2 depicts another system 200, similar to the system 100 but including specific examples of data sources and applications 108. For example, in the system 200 the wearable device 104 and mobile device 106 include sensors such as an accelerometer, a gyroscope and a GPS sensor, which are collectively referred to as motion sensors. It is to be appreciated, however, that embodiments are not limited solely to use with these specific types of sensors or to motion sensors. Instead, embodiments may control access to data from a wide variety of these and other sensor types.

Data from the motion sensors is provided to a walking application 208-1, sleeping application 208-2 and cycling application 208-3, collectively referred to as applications 208. Typically, all sensor data from the different data sources are made available to each of the applications 208, subject to user permissions which may be set at the time the applications 208 are installed, when the applications 208 are first run or opened, etc. The applications 208, however, do not require access to sensor data at all times. For example, walking application 208-1 only needs motion sensor data when the user 101 is walking, the sleeping application 208-2 only needs motion sensor data when the user 101 is sleeping, and the cycling application 208-3 only needs motion sensor data when the user 101 is cycling.

Permission models for application access to sensor data can thus suffer from a number of disadvantages. In some cases, applications 108/208 have access to all user data irrespective of what activity the user 101 is currently involved in. For example, in the Android operating system (OS), if a user may provide access to one or more of the applications 108/208 to use motion sensor data, then such applications 108/208 will have access to motion sensor data at any point in time irrespective of actual activity of the user 101. In such a permission model, the walking application 208-1, for example, can infer the sleeping patterns or habits of the user 101. Similarly, the cycling application 208-3 can figure out the sleeping patterns or habits of the user 101. This can represent a possible leak, as such permission models can allow applications 108/208 to infer more personal insights than what has or would be agreed upon by the user 101.

As used herein, the term "leak" refers to an application receiving more information than is required to complete agreed upon functionality. As an example, the walking application 208-1 receiving motion sensor data from user device 102 when the user is sleeping represents a leak. As a result of this leak, the walking application 208-1 is able to gain various insights into the sleeping pattern of user 101, which is not the claimed functionality of the walking application 208-1. Leaks are a growing problem and concern for users of mobile devices. For example, some studies indicate that more than half of all smartphone users have uninstalled or declined to install an application over concerns about having to share personal information. While some mobile OSs such as Android provide a permission system intended to inform users about the risk of installing applications, the effectiveness of such systems in warning users is unclear. For example, some users may fail to pay attention to, understand or act on warnings related to permission information for applications during installation.

Various approaches may be used for controlling access to sensor data. In one approach, data security for mobile phones utilizes rule-based suppression or perturbation of sensor data, where the rules are defined based on the combination of sensors used by active applications, the location of the device, time of day, and expected accuracy of detecting privacy-sensitive data using a currently active set of sensors. Sensors may be turned off if the system presumes that confidential or sensitive data has been leaked, such as when multiple sensors are on, although this may not be true. Further, turning off sensor data is a simple mechanism which does not consider data specific confidential information. Further, in many applications turning sensor data off is not possible as it may cause the applications themselves to stop working.

Another approach is to use privacy nudging or notifications. Various insights may be gleaned from how and why users review and restrict application permissions with a permission manager or permission model, and how users react to privacy nudges or other notifications which provide alerts to the users about sensor data that are collected by applications. In some cases, notifications may be sent at the moment in which private or sensitive data (e.g., location, a phone identifier or ID, etc.) are being sent to an application, or is being sent from an application to a destination outside of a user's device such as to an external application, application server, etc.

Privacy controls may be instituted by covertly substituting shadow data in place of data that a user wants to keep private. Network transmissions that contain data which a user has made available to an application for on-device use only may be blocked.

Certain devices may be equipped with one or more OS features, tools, or applications that allow a user to manage permissions of applications. Some approaches utilize such OS features, tools or applications to allow a user to browse the permissions of installed applications, to generate permissions reports (e.g., indicating which applications have certain permissions such as auto-start, sending short message service (SMS) messages, etc.) Such OS features, tools or applications may also permit the user to remove application permissions. In some cases, an OS feature, tool or application may allow the user to remove permissions of a given application file before the given application file is installed. An OS feature, tool or application may also prevent applications from leaking private or sensitive data by restricting the categories of data which applications can access. In some cases, applications can be fed fake data or no data at all. For example, a given application may be restricted from accessing a user's contacts, in which case the given application will receive an empty contacts list.

Other OS features, tools or applications may provide a user with insight into how installed applications access system features, such as providing information on which applications have or are using what permissions. Such OS features, tools or applications may further provide, in addition to detailing which applications have or are using what permissions, the option to revoke such permissions.

In some cases, OS features, tools or applications may be configured to detect applications with unadvertised behavior. For example, the description topics of applications may be identified and used to form clusters of related applications. For each cluster, application programming interfaces (APIs) which access sensitive data are detected. Applications in a cluster with uncommon API behavior relative to accessing sensitive data may be separated out. As an example, a weather application that sends SMS messages may be an anomaly. Likewise, a messaging application may not be expected to access current location.

Some approaches may use various types of firewalls. For example, a firewall may run as a front-end application for a Linux firewall to restrict applications from accessing data networks or for controlling traffic within a local area network (LAN) or while connected through a virtual private network (VPN). A firewall application may also or alternatively take control of installed applications to allow or block application connectivity and/or to block background application activity. The firewall application may automatically identify applications installed on a device and generate notifications when newly installed applications access certain features, such as accessing the Internet or World Wide Web. Firewall applications may be configured to stop unwanted communications, allowing for blocking Internet access by selected applications, blocking access to countries or regions, blocking background activities, etc. Firewall applications may also monitor data sent by other applications, using sniffer tools to check whether personal or sensitive information is sent. In some cases, firewall applications may be configured to allow a user to establish different scenarios to prevent leakage of information to specific users. For example, a user may wish to share location details with friends, but not co-workers.

Generally, the above approaches address the problem of data leaks by either: (i) restricting an application's access to data; or (ii) blocking or morphing data when a user is performing a confidential activity such as typing a password, PIN, etc. A general drawback with the above approaches is that restricting or block application access to sensor data can undesirably affect the functionality of an application. Further, blocking sensor data based on known confidential activity, such as typing a password or PIN, can still lead to leaks if a list of defined confidential activity is not comprehensive, on failure to detect confidential activity, on misclassifying confidential activity as non-confidential activity or vice-versa, etc.

Illustrative embodiments seek to overcome these and other disadvantages of permission models by implementing a smart firewall on user device 102, which provides timely access by applications 108/208 to sensor data from the user device 102 based on the current activity of the user 101. Hence, the walking application 208-1 would obtain access to motion sensor data only when the user 101 is walking rather than at all times. The use of such a smart firewall can help prevent leaks. Further, illustrative embodiments provide for reversible data transformation based morphing, such that errors in activity detection or permissions can allow applications to recover needed data at a later stage.

Embodiments, as mentioned above, can provide functionality for selectively providing access to sensor data by matching relevant activities of an application with real-time activity of the user 101 of user device 102. Such features in some embodiments are provided by a "wearable firewall" implementing Management as a Service (MaaS) functionality. In some embodiments, the wearable firewall may be implemented as part of the MaaS360 mobile device management (MDM) solution available from International Business Machines Corporation.

Relevant activities of an application may be determined or derived from text analytics, such as in an application description of the application from an application store from which the application is downloaded. Whenever a given application is installed on user device 102, the wearable firewall figures out what kind of activity is monitored by the given application. This entire process may be automated by, for example, extracting relevant information from the description of the given application from an application store or other source from which the given application is downloaded or otherwise obtained. Image and text analytics algorithms may be used to extract such relevant information. Based on such analysis, a set of legitimate human activity modalities for the given application are provided. The wearable firewall at runtime monitors human activity modalities of the user 101 of user device 102, and selectively provides access by the given application to the sensor data only when the current human activity modality of the user 101 matches the legitimate human activity modalities for the given application. Such legitimate human activity modalities are also referred to herein as a set of permitted activities for the given application.

Figure 3:
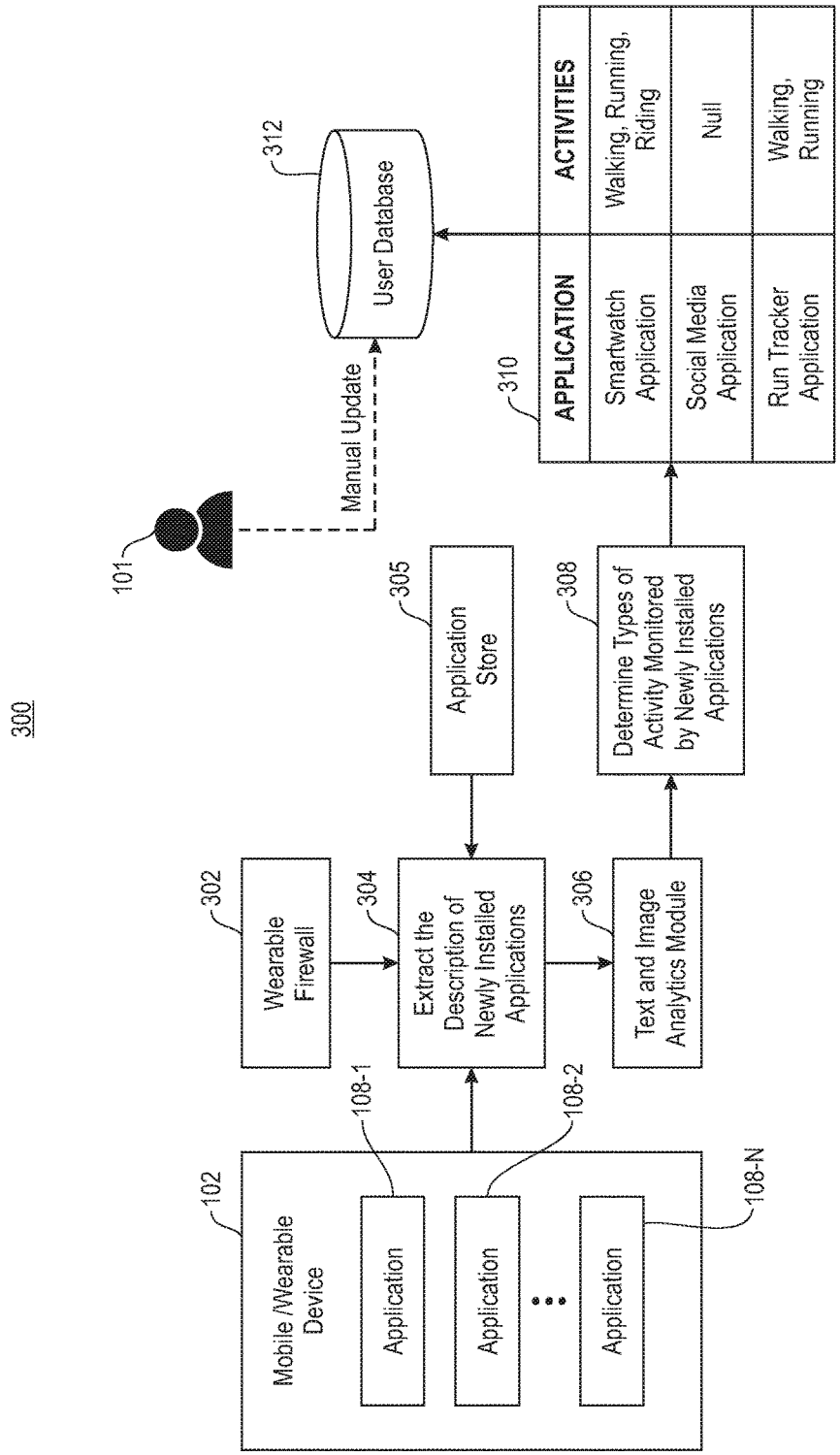
FIG. 3 depicts a processing flow for selectively enabling access by applications to sensor data, according to an exemplary embodiment of the present invention.

FIG. 3 depicts a processing flow 300 for selectively enabling access by applications to sensor data using a wearable firewall 302. As shown, user device 102 (which may be any combination of a wearable device 104 and mobile device 106 as described above) has applications 108. Responsive to detecting installation of new applications, the wearable firewall 302 extracts 304 the description of the new applications from application store 305. Text and image analytics module 306 analyzes images and/or textual descriptions of the newly installed applications from the application store 305 to determine 308 a set of legitimate activities or human activity modalities for the newly installed applications. The determined set of legitimate activities may be used to populate an application permissions table 310, which may be used to update a user database 312 of applications and their associated legitimate activities. As illustrated in FIG. 3, the user 101 may also be permitted to manually update the legitimate or permitted activities for installed applications that are maintained in the user database 312.

In the FIG. 3 example, it is assumed that the newly installed applications include a smartwatch application, a social media application, and a run tracker application, and that the data to be protected includes motion sensor data. Thus, the table 310 includes an entry for the smartwatch application indicating legitimate activities of walking, running or riding, an entry for the social media application indicating "null" to denote no legitimate activities for accessing motion sensor data, and an entry for the run tracker application indicating legitimate activities of walking and running.

Embodiments, as mentioned above, can also provide functionality wherein selectively providing access to sensor data is enabled through the transformation of sensor data. Transformation keys for the transformed sensor data may be distributed to applications having legitimate activity types which match a current activity of the user 101 of user device 102. Such features in some embodiments may also be provided by the wearable firewall 302, and provide enhanced sophistication relative to systems which simply block access to sensor data as will be described in further detail below.

As described above, during installation applications can register user activities during which the applications need access to sensor data (e.g., from the OS of user device 102). Such registered user activities are examples of the above-described "legitimate" activities or activity types. The wearable firewall thus enables human activity-specific sensor data permission requests. The wearable firewall maintains a mapping table, such as the table 310 in user database 312, mapping a set of applications to corresponding activities during which access to sensor data such as motion sensor data should be granted. The wearable firewall is also configured with built-in activity classifier functionality for detecting various activities of the user 101 of user device 102, such as swimming, running, walking, cycling, sleeping, eating, typing, etc. For every activity detected by the wearable firewall, the wearable firewall generates transformation keys used to transform sensor data. By transforming sensor data, it is meant that original sensor data cannot be retrieved from the transformed data without the transformation key. Thus, for example, transforming the sensor data may include encrypting the sensor data or otherwise rendering the sensor data unusable without access to the transformation key.

The transformed sensor data may be streamed to all applications which request access to the sensor data, irrespective of a current activity of the user 101 and the permissions or legitimate activities of the applications. The wearable firewall shares the generated transformation key only with the applications which have registered permissions to obtain access to the sensor data during the detected activity (e.g., the transformation key is shared with applications whose legitimate activities match a current activity of the user 101 of user device 102). The wearable firewall is configured to change the transformation key when a change in the activity of the user 101 of user device 102 is detected.

Applications receiving streamed transformed sensor data apply the transformation key to obtain the original sensor data. The wearable firewall provides a platform such that the applications which have requested the sensor data for specific activities (which match their registered legitimate activities) receive the appropriate transformation key in a timely fashion. Only those applications have access to the original sensor data, thereby realizing human activity-specific sensor data access control. Timely access to sensor data by applications based on the activities of the user 101 prevents applications from inferring unnecessary insights into the behavior of the user 101 not agreed upon during installation or registration of the applications.

Applications which receive the transformation key may utilize the original sensor data to build higher order inferences and insights from the sensor data according to the agreed-upon registered legitimate activities of the applications. For example, a walking application would get access to motion sensor data only when the user is walking and not all the time. The original sensor data may be used by the walking application to obtain higher order inferences of behavior of the user 101, such as walking speed, pattern, style, distance, etc. The walking application, however, would be prevented from obtaining original sensor data when the user 101 is not performing a legitimate activity for the walking application. For example, the walking application would not be able to gain insights into sleeping behavior of the user 101 (assuming that "sleeping" is not a registered legitimate activity for the walking application) as the walking application would not have access to the transformation key required to obtain the original sensor data from transformed data streamed while the user 101 is sleeping. Thus, the wearable firewall can prevent undesirable leaks.

Reversible data transformation provides additional advantages to address misclassification issues. As will be described in further detail below, a current user activity may be determined using classifiers such as machine learning algorithms, which may not provide perfect accuracy. Analytics or user feedback may be used to identify misclassifications. Since illustrative embodiments do not blindly block sensor data, misclassification errors can be resolved at any time by providing an appropriate transformation key. For example, a given application which is incorrectly denied access based on misclassification of current activity of the user 101 of user device 102 may be given access, after detection of such misclassification, by sharing of the appropriate transformation key.

In some embodiments, the wearable firewall may be configured to maintain a time limit of a designated number of time units (e.g., x time units). If a misclassification is detected within the x time units, the wearable firewall can share the appropriate transformation key with appropriate applications to resolve misclassification.

In other embodiments, the user 101 of user device 102 may force sensor data restriction to applications by explicitly choosing the applications at a current time (e.g., time t) to which the user 101 wants to provide access to the sensor data. Based on the user-selected applications, the transformation key is shared. Such features may be useful in situations where numerous applications are installed on user device 102, and the user 101 is not aware of which applications are tracking what. The user 101 can explicitly force restriction of sensor data access based on user activities by selecting desired applications and mapping the activities to such desired applications.

Figure 4:
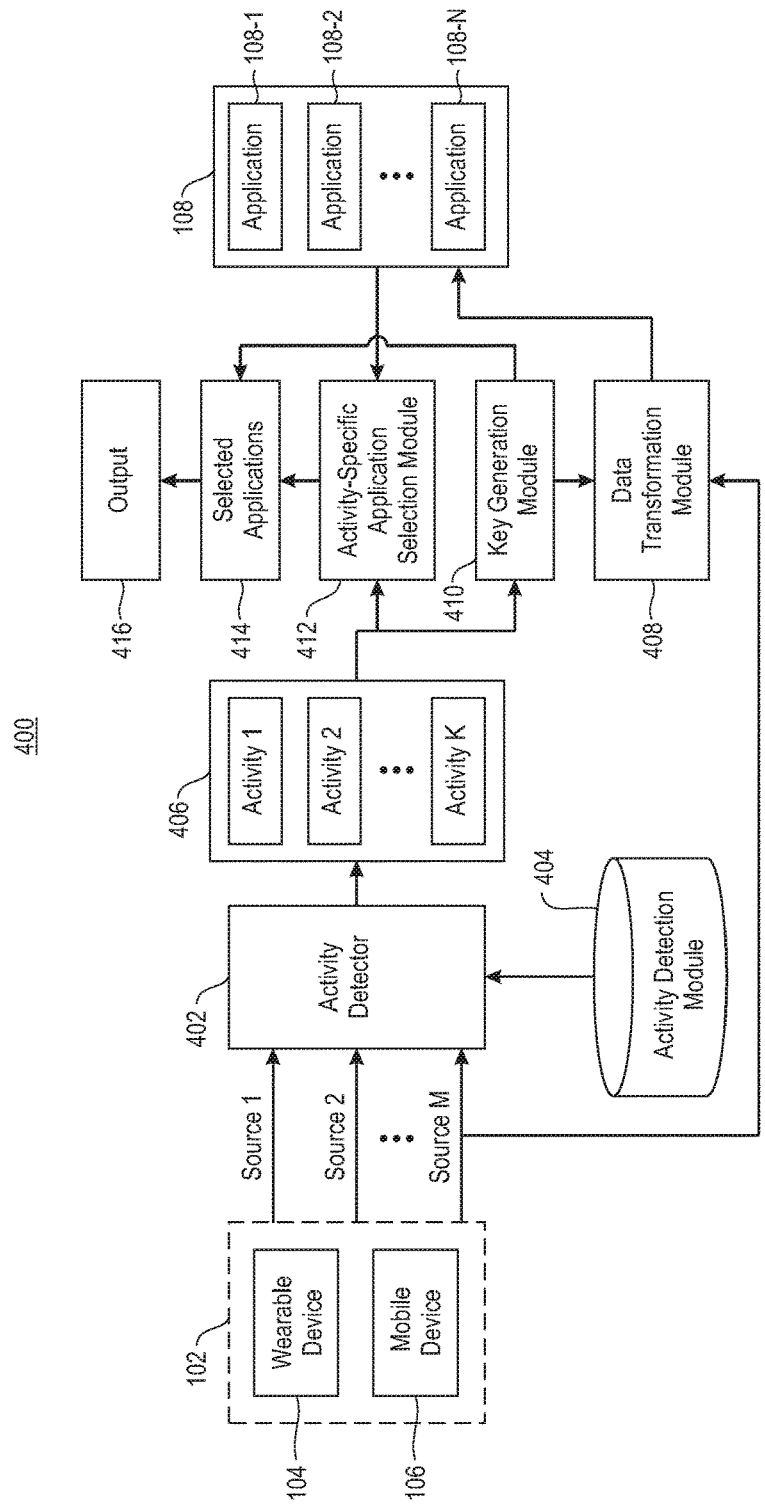
FIG. 4 depicts a processing flow for selectively providing access by enabled applications to sensor data, according to an exemplary embodiment of the present invention.

FIG. 4 depicts a processing flow 400 for selectively providing access by enabled applications to sensor data. User device 102 provides sensor data (e.g., sources 1, 2, . . . , M) to an activity detector 402. An activity detection module 404 coupled to the activity detector 402 is configured to analyze such sensor data to determine a current activity of a user 101 (not explicitly shown in FIG. 4) of user device 102. As a result, the activity detector 402 selects from a list of activities 406 that match current activity of the user 101 of user device 102. The sensor data from user device 102 are also provided to a data transformation module 408, which is configured to transform the data as described above (e.g., to encrypt or otherwise render the original sensor data unusable absent access to a transformation key).

The activities in list 406 which match the current activity of the user 101 of user device 102 are provided to a key generation module 410 and an activity-specific application selection module 412. The key generation module 410 is configured to generate one or more transformation keys.

The sensor data, in some embodiments, may relate to multiple distinct activities of the user 101 of user device 102. For example, a user may be simultaneously walking and typing. Certain ones of the applications 108 may be provided access to typing sensor data but not walking sensor data. Thus, different types of sensor data (or sensor data associated with different types of activities) may have different transformations applied thereto by data transformation module 408. Thus, the key generation module 410 may generate multiple distinct transformation keys for different portions of the sensor data obtained in any given designated time unit. Such distinct transformation keys may be provided to different ones of the applications 108 based on their associated legitimate activities (e.g., a first key provided to a walking application allowing the walking application to obtain original walking sensor data from transformed data streamed to the applications 108 from data transformation module 408, and a second key provided to a social media application allowing the social media application to obtain original typing sensor data from transformed data streamed to the applications 108 from data transformation module 408, etc.).

As described above, in some embodiments the transformation key may be changed whenever it is determined that the current activity of the user 101 of user device 102 has changed. Thus, the key generation module 410 may update or generate a new transformation key responsive to the activity detection module 404 determining that the current activity of the user has changed (e.g., from walking to remaining stationary, from sleeping to awake, etc.). The key generation module 410 provides the updated or new transformation key to the data transformation module 408 such that the transformation (e.g., encryption) of the original sensor data changes and the previous transformation key will no longer be utilizable to obtain the original sensor data from transformed sensor data that are streamed to the applications 108 after updating of the transformation key. Further, in some embodiments transformation keys may be generated for distinct designated time units (e.g., a new transformation key may be generated after expiration of a designated time interval), regardless of whether the activity of the user 101 of user device 102 has changed.

All of the applications 108 receive the transformed data from data transformation module 408. By all of the applications 108, it is meant any application that requests access to the sensor data; the transformed sensor data need not be streamed to an application which does not request access to the sensor data. The activity-specific application selection module 412 selects one or more of the applications 108 that are permitted access to the transformation key (based on the current activity of the user 101 of user device 102 and the legitimate activities of the applications 108). The key generation module 410 provides appropriate transformation keys to the selected applications 414, and such transformation keys are output 416.

The activity detector 402, activity detection module 404, data transformation module 408, key generation module 410 and activity-specific selection module 412 may be part of the wearable firewall application 302 described above. In other embodiments, one or more of the activity detector 402, activity detection module 404, data transformation module 408, key generation module 410 and activity-specific selection module 412 may be implemented by an application different from the wearable firewall 302. In some embodiments, functionality of the wearable firewall 302 and/or one or more of activity detector 402, activity detection module 404, data transformation module 408, key generation module 410 and activity-specific selection module 412 may be implemented by a processing device or platform such as a cloud computing platform external to the user device 102.

Figure 5:
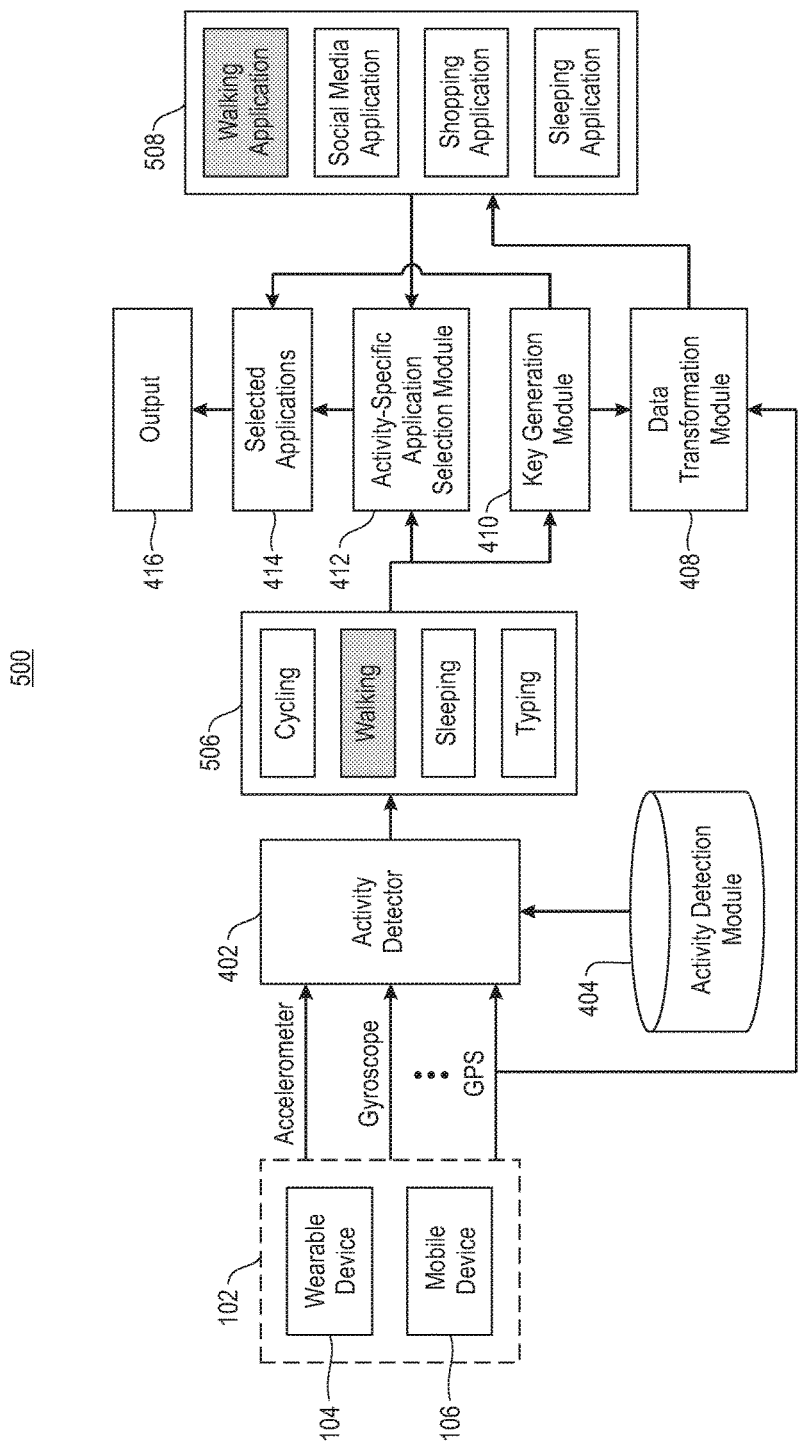
FIG. 5 depicts another processing flow for selectively providing access by enabled applications to sensor data, according to an exemplary embodiment of the present invention.

FIG. 5 shows a processing flow 500 similar to that of processing flow 400, but with specific examples of sensor data or data sources (e.g., accelerometer, gyroscope, GPS), specific examples of activity types 506 (e.g., cycling, walking, sleeping, typing) and specific types of applications 508 (e.g., walking, social media, shopping, and sleeping). It is to be appreciated that such data sources/sensors, activity types and applications are presented by way of example only, and that embodiments are not limited to use solely with the data sources/sensors, activity types and applications shown in FIG. 5.

In the processing flow 500, it is assumed that the sensor data are indicative of a user 101 (not explicitly shown in FIG. 5) of user device 102 that is walking, and thus the activity detector 402 outputs the "walking" activity (denoted by the shading in FIG. 5) to the key generation module 410 and activity-specific application selection module 412. The application-specific selection module 412 receives requests from the applications 508 for access to the original sensor data, and based on the detected activity it is determined that only the walking application is to be provided with the transformation key (e.g., the selected applications 414 includes just the walking application, denoted by the shading in FIG. 5).

The activity detector 402 may implement one or more classifiers, tuned to have high precision which may be at the cost of low recall. In other words, the activity detector 402 will only detect user activity if very confident patterns are found in the sensor data. For example, classifiers implemented by the activity detector 402 may tag a current activity of the user 101 of user device 102 as "sleeping" only if the classifier has high confidence about the tagged activity. While in some cases this may result in false negatives (or applications being denied access due to misclassification of user activity), such false negatives may be remedied as described below using features for handling misclassification of user activity. Advantageously, classifiers tuned for high precision can help to prevent data leaks to unintended applications. Regardless, it may be desired to provide features for handling false positives.

As mentioned above, high precision classifiers pose a risk of not tagging an activity and thus preventing an application with a legitimate claim to the sensor data from being able to retrieve the original sensor data (e.g., the application may be denied the appropriate transformation key due to misclassification). This problem, however, is addressed through the use of reversible transformations of the sensor data such that original sensor data can be retrieved later by an application if a specific activity is not detected or mis-detected at a current time.

Figure 6:
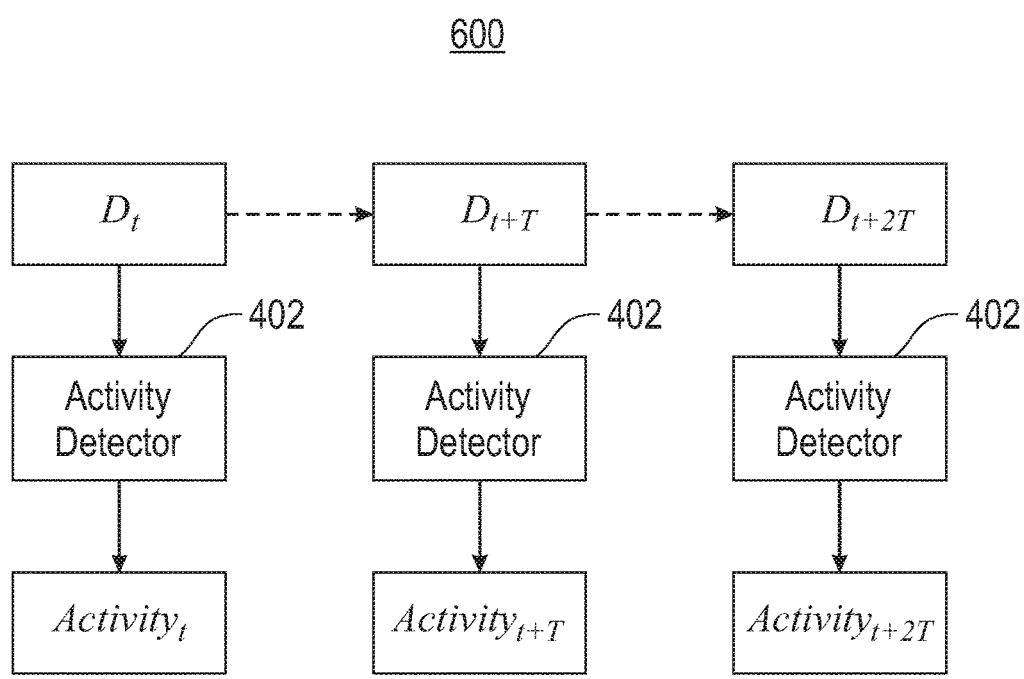
FIG. 6 depicts activity detection over multiple time intervals, according to an exemplary embodiment of the present invention.

In some embodiments, classifiers of the activity detector may implement reinforcement learning. The classifiers may continuously monitor decisions made at different time intervals, and take actions based on the "reward" for decisions made, where indications of correct decisions lead to positive rewards and indications of wrong decisions lead to negative rewards. FIG. 6 depicts an example 600 of activity detection over multiple time intervals. $D_t$ represents the input data at time t, $D_{t+T}$ represents the input data at time t+T, and $D_{t+2T}$ represents the input data at time t+2T. Activity$_t$ represents the detected activity at time t, Activity$_{t+T}$ represents the detected activity at time t+T, and Activity$_{t+2T}$ represents the detected activity at time t+2T. The reward-action strategy may be as follows:

If(Activity$_t$==Activity$_{t+T}$==Activity$_{t+2T}$)
   reward→positive
     action→send the transformation key(s) to the selected applications
       sub-action→use data for classifier fine tuning
Else:
   reward→negative
     action→do not send the transformation key(s), buffer transformation key(s)
       sub-action→do not use data for classifier fine tuning It is to be appreciated that the above reward-action strategy is presented by way of example, and that other embodiments may use other types of reward-action strategies in addition to or in place of the above-described reward-action strategy.

The activity detection module 404 may detect the current activity of the user 101 of user device 102 based on the gathered data. In some cases, the activity detection module 404 can be fine-tuned to a particular user utilizing user-specific activity detection models.

In some embodiments, a user can select the time at which a particular activity is to be performed. An activity model database (which may form a portion of a user-specific activity detection model) is updated once the user completes the scheduled activity, which can be used for user-specific automatic activity detection tasks. Thus, the system can use sensor data from the scheduled activity to learn a pattern of sensor data indicative of a given user activity. The user 101 of user device 102 may receive an alert on the start of the scheduled activity, asking for confirmation that the user is in fact about to perform the scheduled activity. The activity model database is updated once the user confirms the activity, such that the sensor data obtained during the scheduled activity is made available for user-specific automatic activity detection tasks. Such alerts may also be provided when the activity detection module 404 later detects activity that matches the sensor data obtained during the scheduled activity, until the activity model is deemed accurate enough (e.g., a predicted probability of an activity is greater than some designated threshold such as 90 out of 100) and the user need not be alerted.

Figure 7:
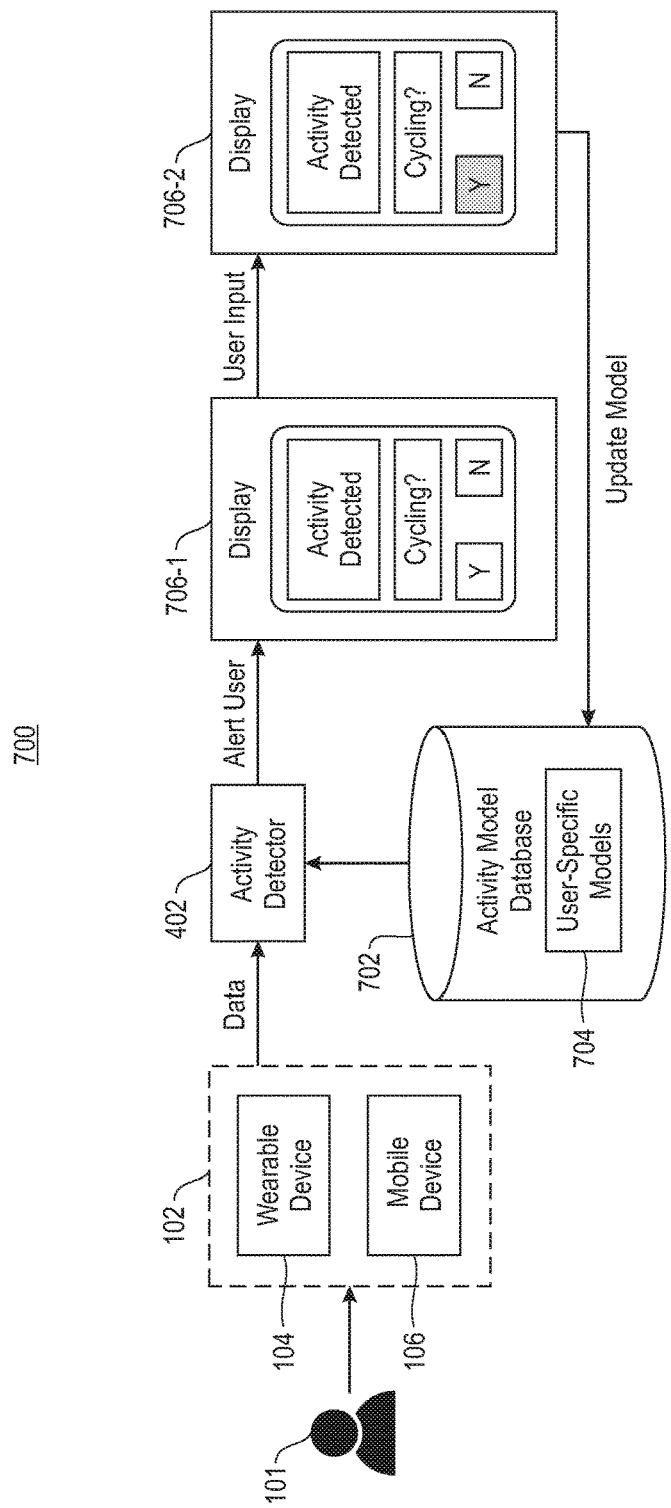
FIG. 7 depicts a processing flow for activity detection, according to an exemplary embodiment of the present invention.

FIG. 7 depicts a processing flow 700 for providing the above-described alerts and updating user-specific activity models. As shown, the activity detector 402 receives sensor data from the user device 102. The user 101 of the user device 102 is alerted (e.g., at the start time of a scheduled activity, when the activity detector determines that current sensor data match that of sensor data obtained during a previously-scheduled activity, etc.). The alert causes generation of display 706-1 on the user device 102. In the FIG. 7 example, the alert indicates that an activity is detected, the type of detected activity (e.g., cycling) and a prompt for confirmation (e.g., Y for yes, N for no) of whether the user 101 is currently performing the detected activity. The user 101 provides input, such as by activation of the "Y" button (denoted by the shading of display 706-2 in FIG. 7) to confirm that the detected activity is accurate. This information is then used to update user-specific activity models 704 in activity model database 702 accessible to the activity detector 402.

Figure 8:
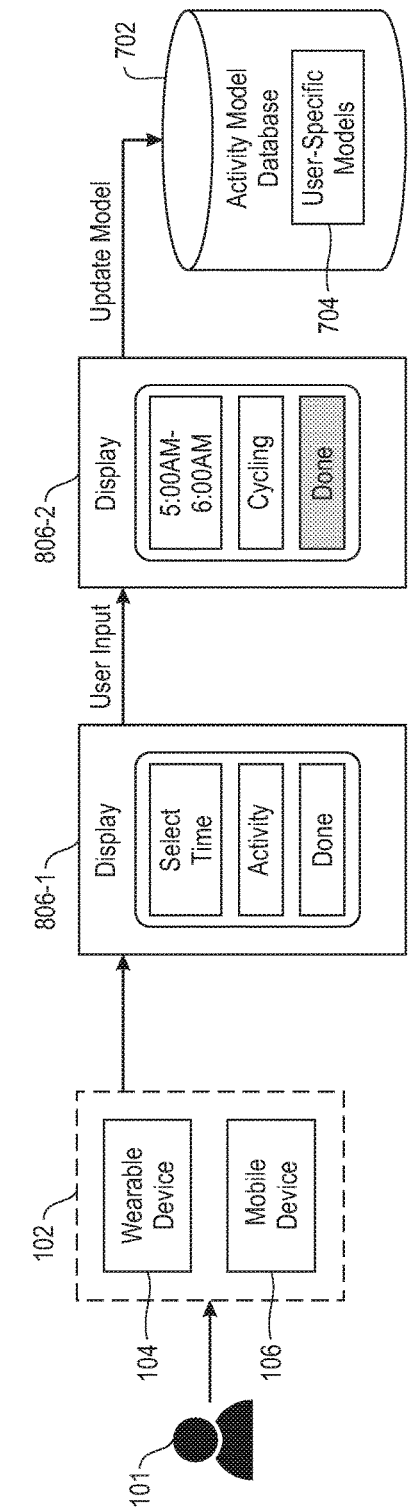
FIG. 8 depicts a processing flow for updating a user-specific activity model, according to an exemplary embodiment of the present invention.

FIG. 8 depicts a processing flow 800 for scheduling an activity. User 101 may activate an interface feature of the user device 102 to cause generation of display 806-1, showing a pop-up notification prompting the user to select a time for the scheduled activity, a type of activity, and a "done" button for confirming entry of the scheduled activity. Following user input, the time and type of the scheduled activity are populated (in the FIG. 7 example, 5:00 AM to 6:00 AM and cycling, respectively). Such information is confirmed by the user 101 activating the done user interface feature (denoted by the shading in display 806-2 of FIG. 8), which causes updates to the user-specific models 704 in activity model database 702.

Referring back to FIG. 4, aspects of transformation key generation will now be described. As discussed above, the activity detector 402, in conjunction with activity detection module 404, analyzes information from various data sources (e.g., sensor data from user device 102) to determine a current activity of the user 101 of user device 102. The current activity may be one or more activities selected from the list of activities 406. A unique transformation key is generated by the key generation module 410 for the detected activity. As discussed above, in cases where sensor data may be indicative of multiple distinct activities (such as typing and walking), different transformation keys may be generated for the sensor data indicative of such distinct activities. The data transformation module 408, which also receives the sensor data from data sources of user device 102, transforms or modulates the sensor data utilizing the transformation keys generated by the key generation module 410. As mentioned above, such transformation may include encrypting or otherwise rendering the original sensor data unusable or unreadable absent possession of corresponding transformation keys.

The transformed or modulated sensor data are provided to each of the applications 108, or at least each application which requests access to the sensor data of user device 102. In some cases, the applications 108 are mobile applications which run on the wearable device 104 and/or mobile device 106. In other cases, one or more of the applications may be a web application or other type of application which is implemented at least partially external to the user device 102

(e.g., a web application may run on a web or application server distinct from the user device 102). By sending transformed or modulated data to the applications 108, leaks of private and confidential data may be avoided.

The applications 108, as discussed above, may be classified based on user input or metadata associated with the applications 108 (e.g., metadata that are extracted or otherwise determined from images or text descriptions of the applications 108 from application store 305). The activity-specific application selection module 412 will select those applications whose legitimate registered activities match the current activity of the user 101 of user device 102. The transformation keys are output 416 to such selected applications 414 so that the selected applications 414 can demodulate or otherwise process the transformed data to obtain the original sensor data.

Embodiments utilize reversible data transformation, rather than data blocking, at least in part to avoid issues related to misclassification. Identifying the applications 108 that should receive the transformation key (e.g., the selected applications 414) depends on a correct classification of the current activity of the user 101 of user device 102. Activity classification may be based on a classifier which utilizes a machine learning model. Machine learning models, however, are not perfectly accurate, and thus there is a chance of misclassification.

Figure 9:
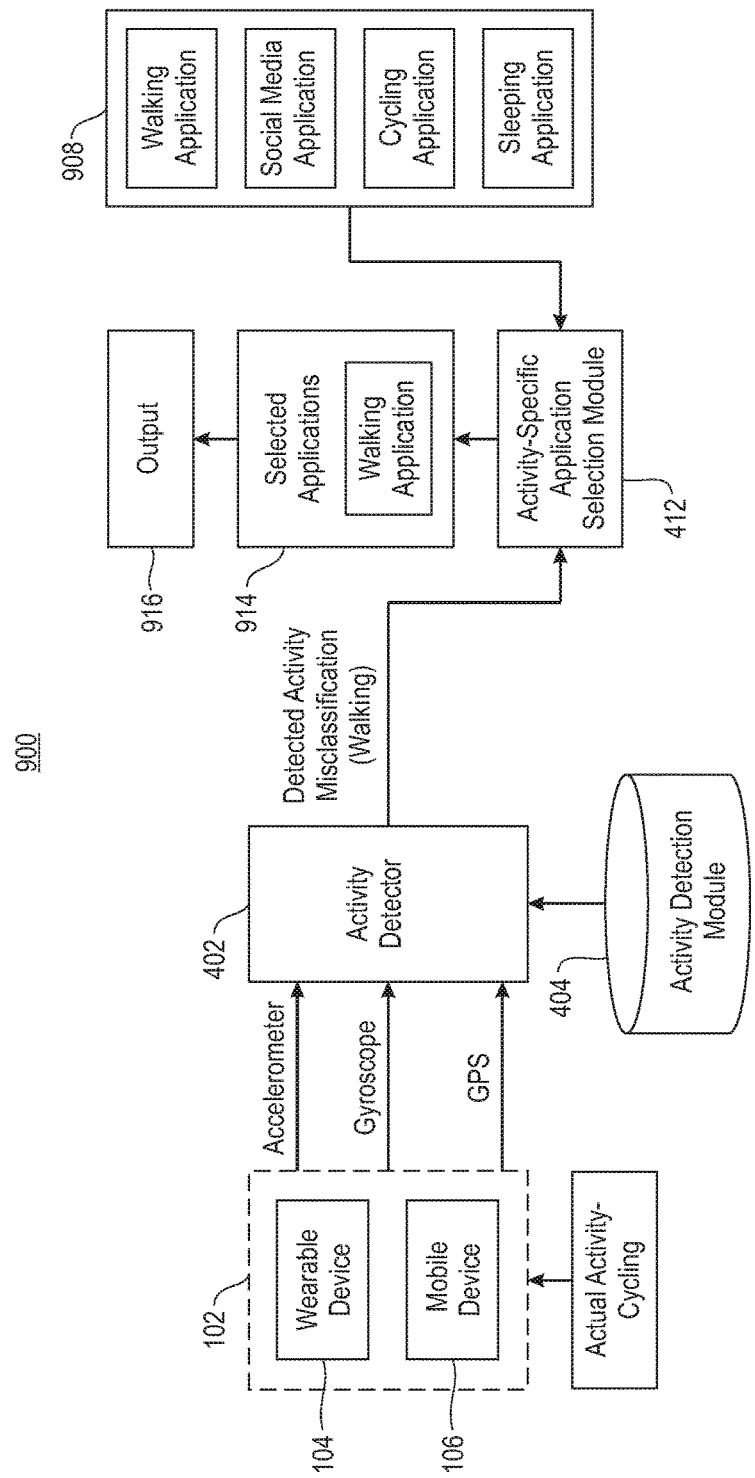
FIG. 9 depicts a processing flow for blocking application access to sensor data, according to an exemplary embodiment of the present invention.

FIG. 9 depicts a processing flow 900 for blocking application access to sensor data, illustrating drawbacks of blocking techniques due to misclassification. In the FIG. 9 example, it is assumed that the actual current activity of the user is cycling, but that the activity detector 402/activity detection module 404 misclassifies the current activity as walking. Based on this misclassification, the activity-specific application specification module 412 selects from applications 908 the walking application to include in the selected applications 914 to which the transformation keys are output 916.

The user 101 of user device 102 may receive a notification of the selected applications 914, and learn that the walking application has received sensor data while the user 101 was actually cycling. The user 101 may discover this error, and want to provide access to the correct application (e.g., the cycling application). However, the sensor data may no longer exist, as the sensor data may be generated at runtime and deleted after being streamed to the applications 908. One solution is to store the sensor data in the user device 102 for some designated period of time. This, however, can require large amounts of space or memory, which is often constrained in wearable devices and mobile devices.

Another solution is to use backend servers, such as backend application servers associated with the applications 908, to store the data. If an application is incorrectly denied access to the transformation key, such as the cycling application in the FIG. 9 example which is denied access to the transformation key due to the misclassification of the current activity of user 101 of user device 102 by the activity detector 402, the transformation key may later be provided to that application on the user 101 detecting the error. That application can then re-run analytics on the previously received transformed sensor data using the provided transformation key to obtain the original sensor data.

In a blocking method, the OS of the user device 102 will initially block all sensor data from being provided to applications. Once the OS has determined the activity of the user (e.g., using an algorithm or user input), the OS will share buffered sensor data with relevant applications. This simple blocking technique is heavily dependent on correct classification of the current user activity, as misclassification can lead to leaks of confidential information. Moreover, since data are blocked, the data cannot be retrieved in cases of misclassification without incurring significant costs in terms of storage resources which are often constrained in wearable and other mobile devices. Further, the need to temporarily store or buffer the sensor data also incurs a costly storage burden, as it may not be known how long the sensor data need to be buffered. The raw sensor data may be large, and the unknown time span for storage can lead to requiring excessive amounts of available storage. Further, some applications may become unstable due to blocking of sensor data when the application is expecting to receive such sensor data.

Embodiments which utilize sensor data transformation can overcome the above-noted disadvantages of blocking techniques. Some embodiments may use encryption/decryption techniques for data transformation. With high precision classifiers for activity detection, embodiments can assure that false positives are reduced (e.g., providing data to unauthorized applications is reduced). High precision classifiers may also pose a risk of false negatives (e.g., not providing a transformation key to an authorized application). The risk of false negatives, however, is addressed by utilizing reversible transformation of the sensor data. Instead of storing the sensor data in the OS of user device 102, embodiments utilize approaches wherein transformed data are streamed to all requesting applications. Thus, the storage burden is offloaded to the application side (e.g., to backend application servers external to user device 102) which may be expected to store the sensor data anyway. The applications get the transformed sensor data at all times, but only receive the transformation key to decrypt the transformed sensor data when the current activity of the user 101 of user device 102 matches legitimate activities for the applications. Since applications can receive the transformed sensor data whenever requested, problems associated with applications becoming unstable or crashing due to blocking are avoided.

Figure 10:
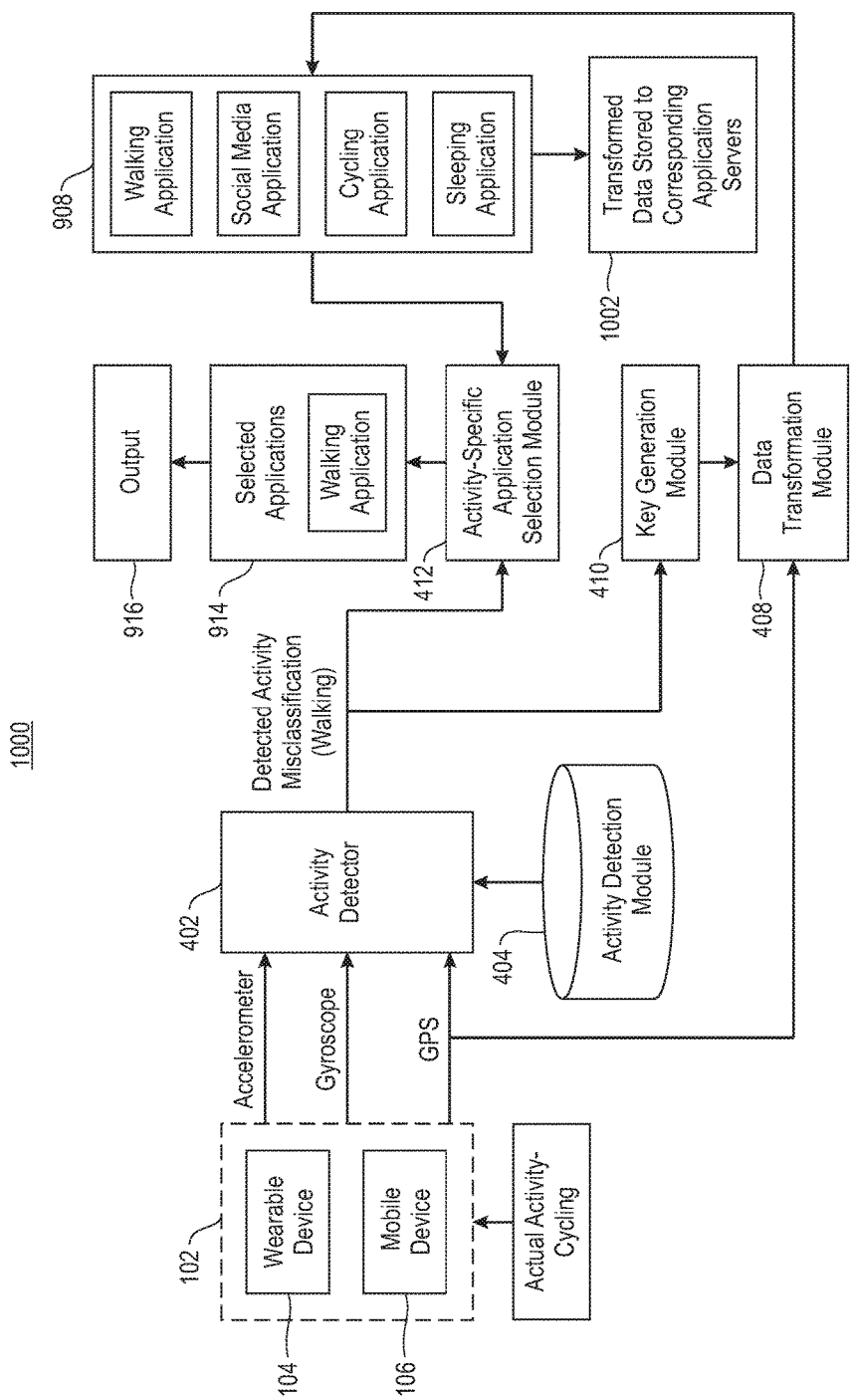
FIG. 10 depicts a processing flow for transforming sensor data provided to applications, according to an exemplary embodiment of the present invention.

FIG. 10 shows an example processing flow 1000 for transforming sensor data provided to applications, which overcomes disadvantages associated with the blocking technique illustrated in processing flow 900 of FIG. 9. Similar to FIG. 9, the current activity of the user 101 of user device 102 is cycling, but the activity detector 402/activity detection module 404 misclassifies the sensor data as indicating an activity of walking. The sensor data, however, are provided to data transformation module 408, which transforms the original sensor data utilizing a transformation key generated by the key generation module 410. The transformed data are provided to the applications 908, and is stored on application servers associated with the applications 908 as indicated in block 1002. Thus, even though the cycling application is not included in the selected applications 914, it still receives the transformed sensor data.

Figure 11:
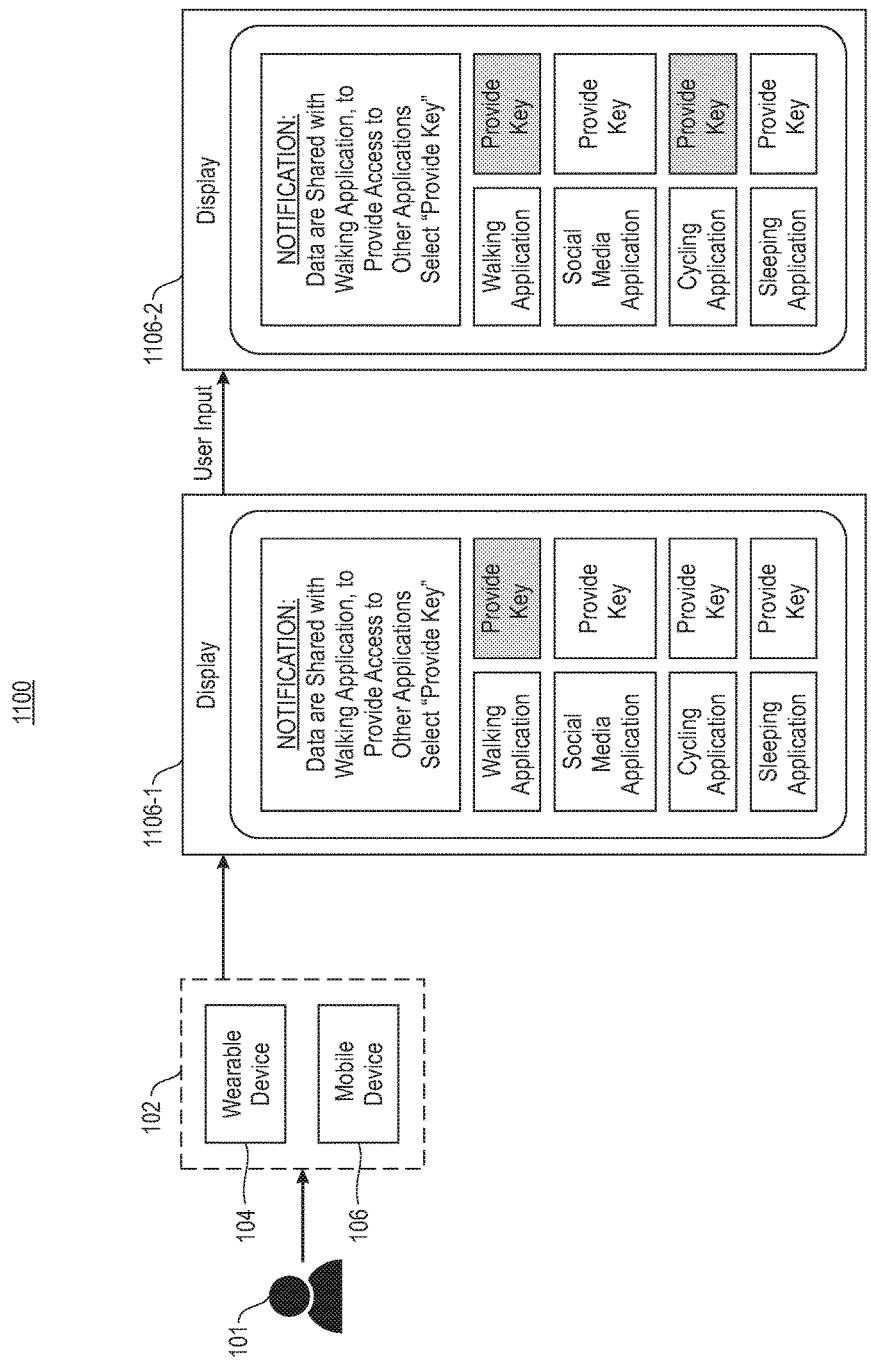
FIG. 11 depicts a processing flow for notification-based enabling of application access to sensor data, according to an exemplary embodiment of the present invention.

FIG. 11 depicts a processing flow 1100 for notification-based enabling of application access to the transformed sensor data in the FIG. 10 example. As shown, the user 101 of user device 102 is provided with a notification on display 1106-1, indicating that data are shared with the walking application and providing an option to enable access to other applications by activating "provide key" user interface features. The display 1106-1 indicates that the walking application provide key interface feature is selected (as denoted by the shading in FIG. 11). After user input, the display is updated by the user activating the cycling application provide key interface feature (as denoted by the shading in display 1106-2 of FIG. 11). In response, the cycling application is provided with the appropriate transformation key. As the cycling application has already received the transformed data, it can now obtain the original sensor data using the provided transformation key.

To prevent key stealing (e.g., an unauthorized application stealing a transformation key from the key generation module or from an authorized application which has received the transformation key), various techniques may be used. In some embodiments, an OS feature or tool of user device 102 may allow for protected internal storage, to save application-specific data inside an application space accessible only to a corresponding application. In other embodiments, secure containers may be used for dedicated application storage space. Various other techniques, including combinations of the above-described and other techniques, may be used for provide for safe key management.

As discussed above, classifiers implemented by the activity detector 402/activity detection module 404 may be continuously classifying between modalities (e.g., different activities). For higher security, the classifier in some embodiments is tuned to have more false negatives than false positives. As a result, embodiments provide a failure or misclassification strategy for false negatives (e.g., a sleeping application that is not provided with the transformation key to decrypt streamed sensor data while the user 101 of user device 102 is actually sleeping). Modality-event triggered transformation key changes provides for dynamic application-level security (e.g., when the user 101 of user device 102 changes from performing one activity to another, or ceasing a certain activity, the transformation keys are updated). In the case of misclassifications, embodiments may send a notification to an application affected by a false negative. This notification may indicate, for example, a current transformation key as well as a length of time that the current transformation key has been used to transform streamed data. In the case of a misclassification detected after a given activity has ceased, the notification may provide the appropriate transformation key along with an indication of when that transformation key was used to encrypt the transformed data streamed to the application. The application should buffer the streamed transformed sensor data to provide support for processing in the case of false negatives.

In some embodiments, the system waits until a very high confidence in a detected activity is reached before sharing a transformation key with appropriate applications. Until the high confidence is reached, the transformed data streamed to the applications is unusable. This still provides advantages relative to blocking, as the user device 102 is not required to buffer the sensor data until the high confidence is reached, reducing run-time overhead and simplifying data exchange with applications during false negatives.

Further, the act of blocking data may be considered a security leak in some instances. If an application knows that the user device 102 is blocking sensor data at times when certain modalities or activities are being performed by the user 101 of user device 102, then applications can infer (at least partially) the activity data. In contrast, data transformation methods used herein provide the applications with transformed data streams. From this, applications cannot infer anything about the classifier detecting activity of the user 101 of user device 102 until the user device 102 specifically sends out the correct transformation key. Thus, information protection using sensor data transformation techniques described herein is enhanced relative to blocking techniques.

Figure 12:
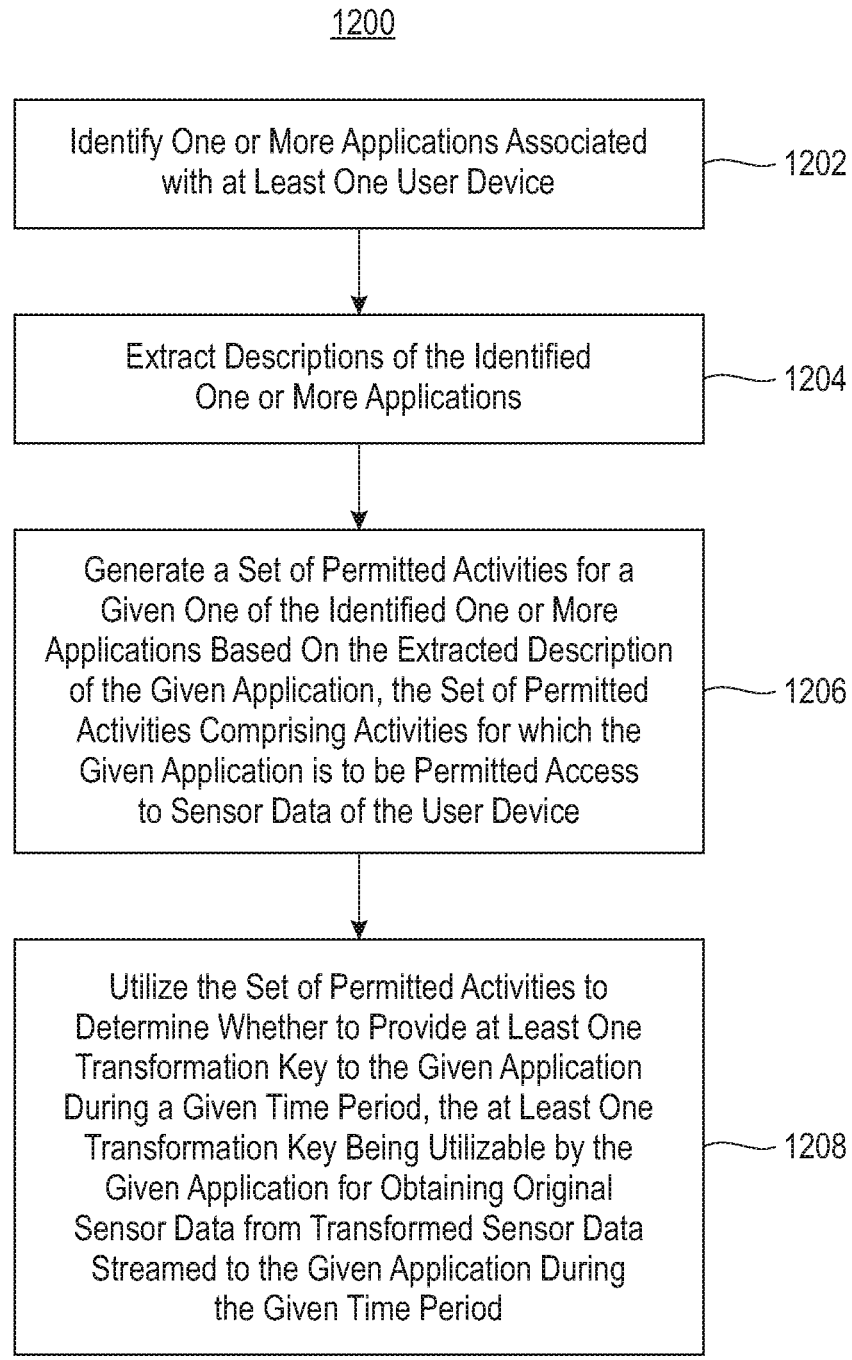
FIG. 12 depicts a process for enabling application access to sensor data, according to an exemplary embodiment of the present invention.

FIG. 12 depicts a process 1200 for enabling access to sensor data. The process 1200 begins with step 1202, identifying one or more applications associated with at least one user device. In some embodiments, step 1202 may include identifying the applications responsive to installation of the applications on the user device, responsive to first use of the applications on the user device, etc. In step 1204, descriptions of the identified one or more applications are extracted. Extracting descriptions in step 1204 may include obtaining image and textual metadata associated with the applications, such as from an application store from which the applications were obtained.

In step 1206, a set of permitted activities for a given one of the identified one or more applications is generated based on the description of the given application extracted in step 1204. The set of permitted activities may comprise activities for which the given application is to be permitted access to sensor data of the user device. Step 1206 in some embodiments may be further based on user input of one or more permitted activities for the given application.

The process continues with step 1208, utilizing the set of permitted activities to determine whether to provide at least one transformation key to the given application during a given time period. The at least one transformation key is utilizable by the given application for obtaining original sensor data from transformed data that are streamed to the given application during the given time period. Steps 1206 and 1208 may be repeated for each of the identified applications. Additional details regarding step 1208 will be described below in conjunction with FIG. 13.

Figure 13:
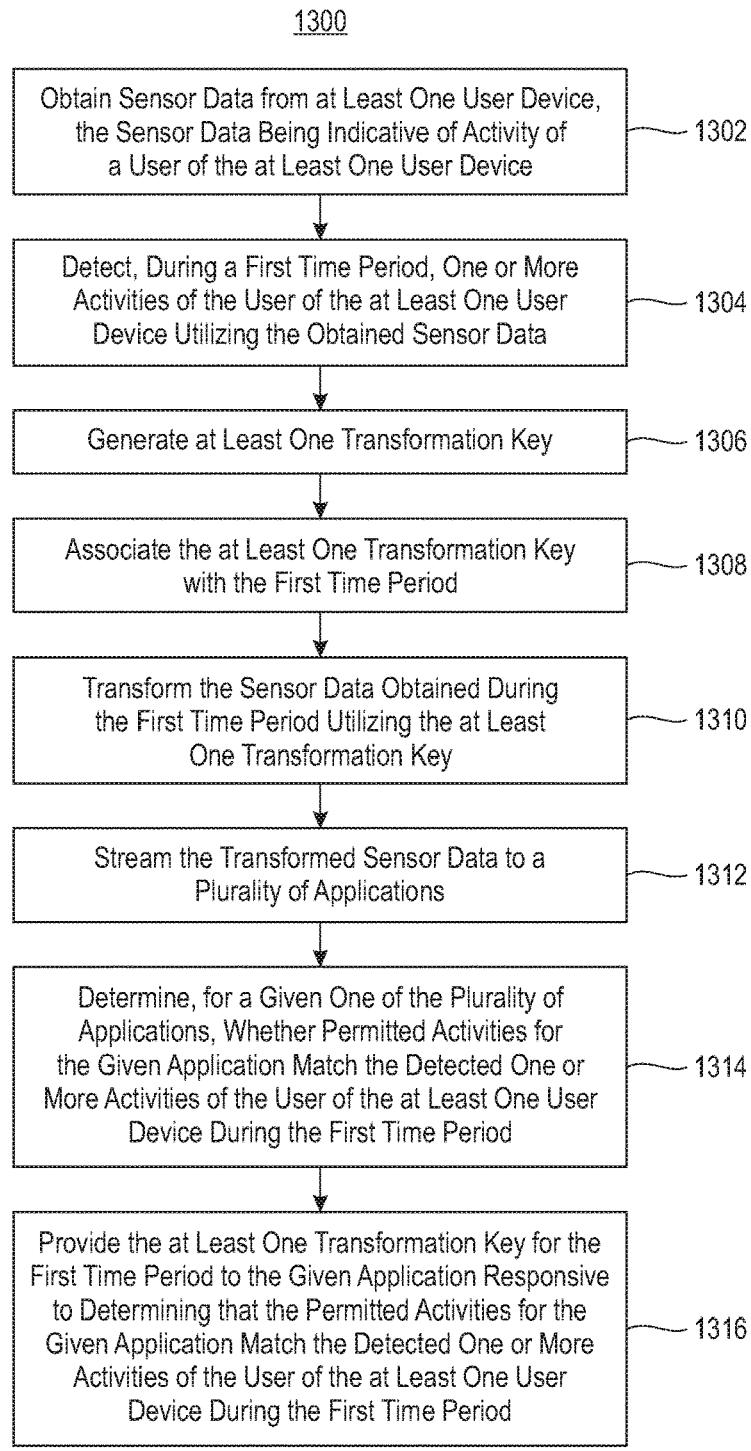
FIG. 13 depicts a process for transforming sensor data provided to applications, according to an exemplary embodiment of the present invention.

FIG. 13 depicts a process 1300 for transforming sensor data provided to applications. The process 1300 begins with step 1302, obtaining sensor data from at least one user device. The sensor data are indicative of activity of a user of the at least one user device. The at least one user device may comprise a wearable device, a mobile device such as a smartphone, or a combination of a wearable device and a mobile device. The sensor data may comprise motion sensor data, such as that obtained from sensors such as accelerometers, gyroscopes, GPS devices, etc.

The process 1300 continues with step 1304, detecting, for a first time period, one or more activities of the user of the at least one user device utilizing the obtained sensor data. In step 1306, at least one transformation key is generated and in step 1308, the at least one transformation key is associated with the first time period. The sensor data obtained during the first time period are transformed utilizing the at least one transformation key in step 1310. The transformation key may be an encryption key, and step 1310 may include encrypting the sensor data obtained during the first time period utilizing the encryption key.

The transformed sensor data are then streamed to a plurality of applications in step 1312. Streaming the sensor data in step 1312 may include streaming the transformed data for storage by application servers associated with the plurality of applications, the application servers being external to the at least one user device.

In step 1314, a determination is made, for a given application, whether permitted activities for the given application match the detected one or more activities of the user of the at least one user device during the first time period. Responsive to a positive determination in step 1314 (e.g., that the permitted activities for the given application match the detected one or more activities of the user of the at least one user device during the first time period), the at least one transformation key is provided to the given application in step 1316. Steps 1314 and 1316 may be repeated for each of the plurality of applications.

In some embodiments, step 1316 is performed during the first time period. In other embodiments, step 1316 may be performed subsequent to the first time period, such as responsive to mis-detection of one or more activities of the user during the first time period.

Steps 1314 and 1316, in some embodiments, may further include generating a notification for presentation on a display of the at least one user device. The notification may indicate selected ones of the plurality of applications having permitted activities matching the detected one or more activities of the user of the at least one user device during the first time period as well as user interface features for enabling or disabling sharing of the at least one transformation key for the first time period with each of the plurality of applications.

In some embodiments, step 1304 may utilize a machine learning classifier. The machine learning classifier may be trained, such as during user-specified time periods during which the user of the at least one user device performs one or more known activities. Such user-specified time periods may be pre-scheduled time periods. The user-specified time periods may also or alternatively include time periods during which obtained sensor data exhibit a threshold level of similarity to sensor data obtained during a previous time period during which the user performed the one or more known activities.

The steps of the process 1300 may be repeated periodically. For example, responsive to detecting a change in the one or more activities of a user of the at least one user device, an end of the first time period is marked and a second time period is started. Step 1304 may be repeated to detect the new activities of the user, and steps 1306 and 1308 may be repeated to generate an updated transformation key and to associate the updated transformation key with the second time period. Step 1310 may be repeated to transform the sensor data obtained in the second time period utilizing the updated transformation key. The sensor data transformed using the updated transformation key are streamed by repeating step 1312. Steps 1314 and 1316 may be repeated, matching the permitted list of activities to the activities detected in the second time period and providing the updated transformation key responsive to such determinations.

In some embodiments, activities detected in step 1304 during the first time period may comprise a first activity associated with a first portion of the sensor data obtained during the first time period and at least a second activity associated with a second portion of the sensor data obtained during the first time period. In such cases, step 1306 may include generating a first transformation key and at least a second transformation key, with step 1308 including associating the first transformation key with the first activity and associating the second transformation key with the second activity. Step 1310 would then include transforming the first portion of the sensor data obtained during the first time period with the first transformation key and transforming the second portion of the sensor data obtained during the first time period with the second transformation key. Step 1312 would proceed with streaming the transformed first and second portions of the sensor data. Step 1314 would include separate determinations for matching the permitted list of activities with the first and second activities, and step 1316 would proceed with providing the first and second transformation keys responsive to such determinations. In some cases, a given application may thus receive the first transformation key but not the second transformation key, or vice versa, depending on whether its permitted activities match the first and second activity.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
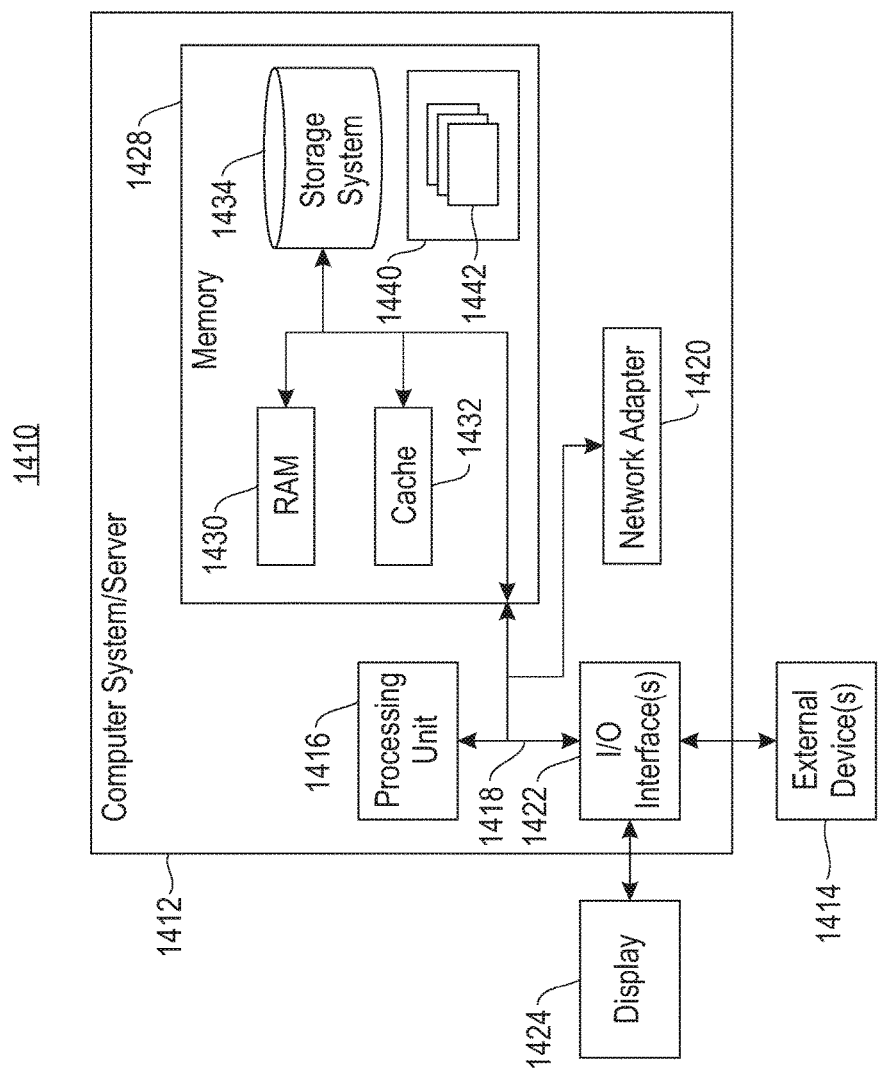
FIG. 14 depicts a computer system in accordance with which one or more components/steps of techniques of the invention may be implemented, according to an exemplary embodiment of the invention.

One or more embodiments can make use of software running on a general-purpose computer or workstation. With reference to FIG. 14, in a computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices such as mobile user device 102 and wearable device 104, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

The bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1412 typically includes a variety of computer system readable media. Such media may be any available media that is accessible by computer system/server 1412, and it includes both volatile and non-volatile media, removable and non-removable media.

The system memory 1428 can include computer system readable media in the form of volatile memory, such as random access memory (RAM) 1430 and/or cache memory 1432. The computer system/server 1412 may further include other removable/non-removable, volatile/nonvolatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus

1418 by one or more data media interfaces. As depicted and described herein, the memory 1428 may include at least one program product having a set (e.g., at least one) of program modules that are configured to carry out the functions of embodiments of the invention. A program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1214 such as a keyboard, a pointing device, a display 1424, etc., one or more devices that enable a user to interact with computer system/server 1412, and/or any devices (e.g., network card, modem, etc.) that enable computer system/server 1412 to communicate with one or more other computing devices. Such communication can occur via I/O interfaces 1422. Still yet, computer system/server 1412 can communicate with one or more networks such as a LAN, a general WAN, and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
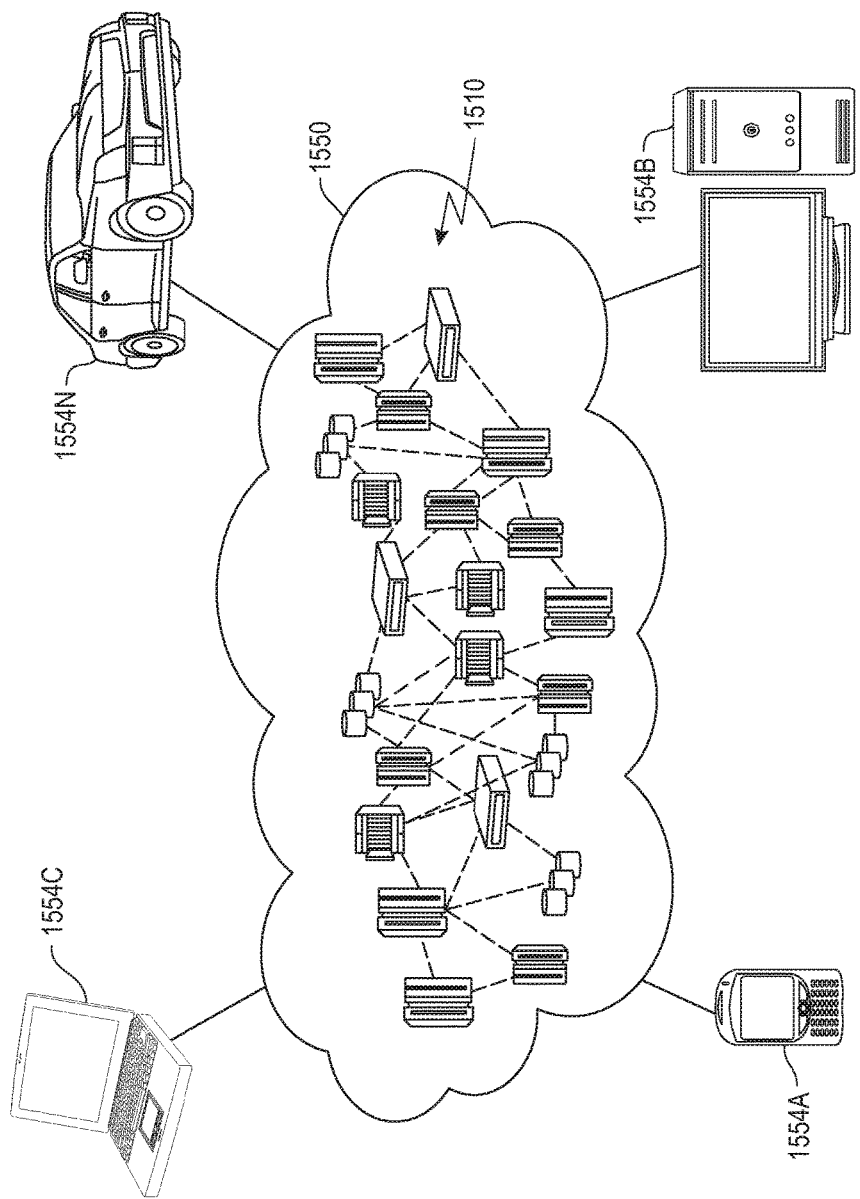
FIG. 15 depicts a cloud computing environment, according to an exemplary embodiment of the present invention.

Referring now to FIG. 15, illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
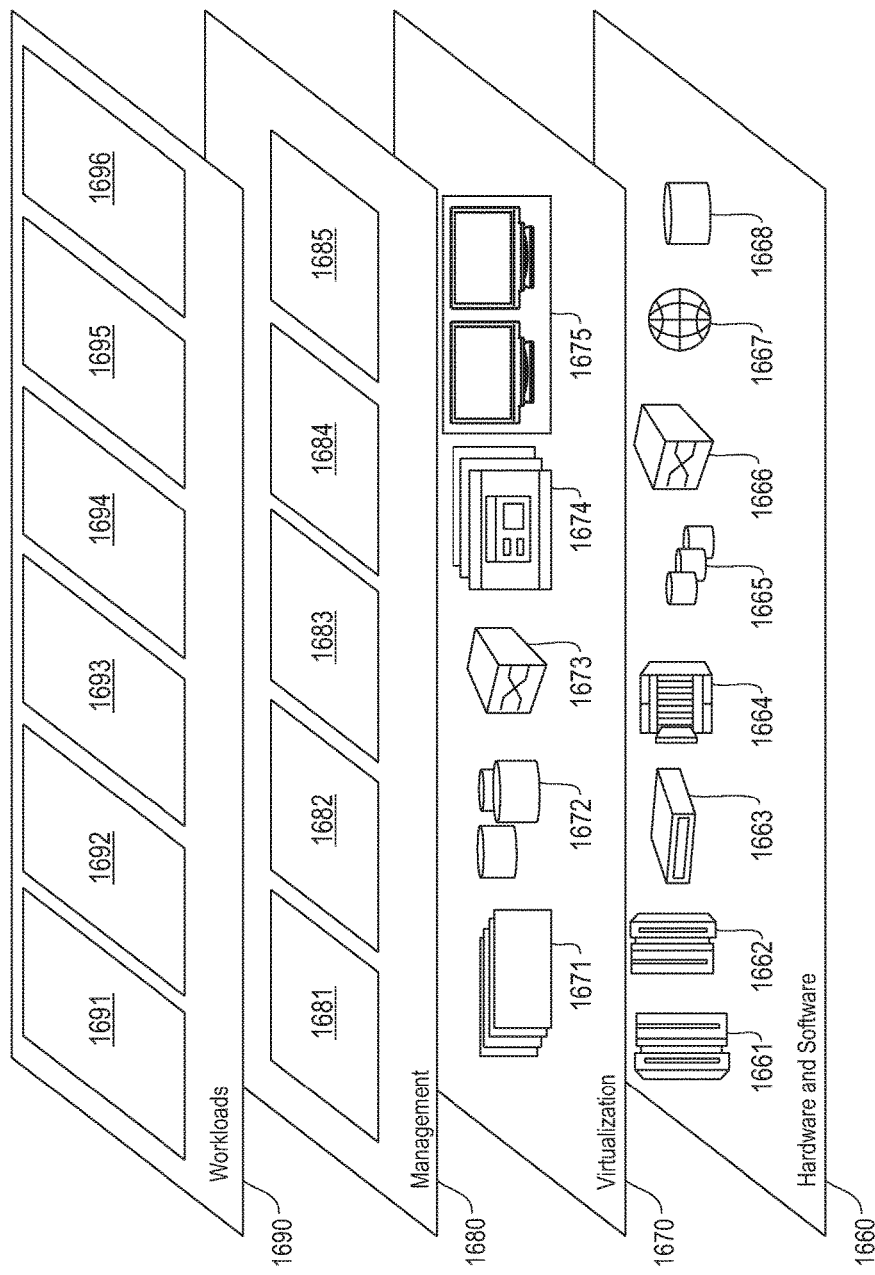
FIG. 16 depicts abstraction model layers, according to an exemplary embodiment of the present invention.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667 and database software 1668.

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and Pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Examples of workloads and functions which may be provided from this layer include: mapping and navigation 1691; software development and lifecycle management 1692; virtual classroom education delivery 1693; data analytics processing 1694; transaction processing 1695; and sensor data processing 1696, which may perform various functions described above with respect to enabling access by applications to sensor data and/or transforming sensor data provided to applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
obtaining sensor data from at least one user device, the sensor data being indicative of activity of a user of the at least one user device;
detecting, for a first time period, one or more activities of the user of the at least one user device utilizing the obtained sensor data, wherein said detecting comprises using a machine learning classifier to detect the one or more activities of the user of the at least one user device;
generating at least one transformation key;
associating the at least one transformation key with the first time period;
transforming the sensor data obtained during the first time period utilizing the at least one transformation key;
streaming the transformed sensor data to a plurality of applications;
determining, for a given one of the plurality of applications, whether permitted activities for the given application match the detected one or more activities of the user of the at least one user device during the first time period; and
providing the at least one transformation key for the first time period to the given application responsive to determining that the permitted activities for the given application match the detected one or more activities of the user of the at least one user device during the first time period;
wherein the steps are carried out by at least one computing device.

2. The method of claim 1, wherein the at least one user device comprises at least one of a wearable device and a mobile device.

3. The method of claim 1, wherein streaming the transformed data to the plurality of applications comprises streaming the transformed data for storage by application servers associated with the plurality of applications, the application servers being external to the at least one user device.

4. The method of claim 1, wherein the sensor data comprise motion sensor data.

5. The method of claim 1, wherein the at least one transformation key comprises an encryption key, and wherein transforming the sensor data obtained during the first time period comprises encrypting the sensor data obtained during the first time period utilizing the encryption key.

6. The method of claim 1, further comprising, responsive to detecting a change in the one or more activities of the user of the at least one user device:
marking an end of the first time period and a start of a second time period;
generating at least one updated transformation key;
associating the at least one updated transformation key with the second time period;
transforming the sensor data obtained during the second time period utilizing the at least one transformation key;
determining, for the given application, whether permitted activities for the given application match the detected one or more activities of the user of the at least one user device during the second time period; and
providing the at least one updated transformation key for the second time period to the given application responsive to determining that the permitted activities for the given application match the detected one or more activities of the user of the at least one user device during the second time period.

7. The method of claim 1, further comprising training the machine learning classifier during a user-specified time period during which the user performs one or more known activities.

8. The method of claim 7, wherein the user-specified time period comprises at least one of: a pre-scheduled time period during which the user performs the one or more known activities; and a time period during which the obtained sensor data exhibit a threshold level of similarity to sensor data obtained during a previous time period during which the user performed the one or more known activities.

9. The method of claim 1, wherein providing the at least one transformation key for the first time period to the given application is performed during the first time period.

10. The method of claim 9, wherein providing the at least one transformation key for the first time period to the given application is performed subsequent to the first time period responsive to mis-detection of one or more activities of the user during the first time period.

11. The method of claim 1, further comprising repeating the determining and providing steps for each of the plurality of applications.

12. The method of claim 11, further comprising generating a notification for presentation on a display of the at least one user device, the notification comprising:
indications of selected ones of the plurality of applications having permitted activities matching the detected one or more activities of the user of the at least one user device during the first time period; and
user interface features for enabling or disabling sharing of the at least one transformation key for the first time period with each of the plurality of applications.

13. The method of claim 1, wherein:
the detected one or more activities of the user of the at least one user device during the first time period comprises a first activity associated with a first portion of the sensor data obtained during the first time period and at least a second activity associated with a second portion of the sensor data obtained during the first time period;
generating the at least one transformation key comprises generating a first transformation key and at least a second transformation key;
associating the at least one transformation key with the first time period comprises associating the first transformation key with the first activity and associating the second transformation key with the second activity;
transforming the sensor data obtained during the first time period utilizing the at least one transformation key comprises transforming the first portion of the sensor data utilizing the first transformation key and transforming the second portion of the sensor data utilizing the second transformation key; and
providing the at least one transformation key for the first time period to the given application comprises:
providing the first transformation key for the first time period to the given application responsive to determining that the permitted activities of the given application match the first activity; and
providing the second transformation key for the first time period to the given application responsive to determining that the permitted activities of the given application match the second activity.

14. A computer program product, the computer program product comprising a computer readable storage medium having program instructions embodied therewith, the program instructions executable by at least one computing device to cause the at least one computing device to perform steps of:
obtaining sensor data from at least one user device, the sensor data being indicative of activity of a user of the at least one user device;
detecting, for a first time period, one or more activities of the user of the at least one user device utilizing the obtained sensor data, wherein said detecting comprises using a machine learning classifier to detect the one or more activities of the user of the at least one user device;
generating at least one transformation key;
associating the at least one transformation key with the first time period;
transforming the sensor data obtained during the first time period utilizing the at least one transformation key;
streaming the transformed sensor data to a plurality of applications;
determining, for a given one of the plurality of applications, whether permitted activities for the given application match the detected one or more activities of the user of the at least one user device during the first time period; and
providing the at least one transformation key for the first time period to the given application responsive to determining that the permitted activities for the given application match the detected one or more activities of the user of the at least one user device during the first time period.

15. A system comprising:
a memory; and
at least one processor coupled to the memory and configured for:
obtaining sensor data from at least one user device, the sensor data being indicative of activity of a user of the at least one user device;
detecting, for a first time period, one or more activities of the user of the at least one user device utilizing the obtained sensor data, wherein said detecting comprises using a machine learning classifier to detect the one or more activities of the user of the at least one user device;

generating at least one transformation key;

associating the at least one transformation key with the first time period;

transforming the sensor data obtained during the first time period utilizing the at least one transformation key;

streaming the transformed sensor data to a plurality of applications;

determining, for a given one of the plurality of applications, whether permitted activities for the given application match the detected one or more activities of the user of the at least one user device during the first time period; and providing the at least one transformation key for the first time period to the given application responsive to determining that the permitted activities for the given application match the detected one or more activities of the user of the at least one user device during the first time period.

16. A computer-implemented method, comprising steps of:

identifying one or more applications associated with at least one user device;

extracting descriptions of the identified one or more applications;

generating a set of permitted activities for a given one of the identified one or more applications based on the extracted description of the given application, the set of permitted activities comprising activities for which the given application is to be permitted access to sensor data of the user device;

utilizing the set of permitted activities to determine whether to provide at least one transformation key to the given application during a given time period, the at least one transformation key being utilizable by the given application for obtaining original sensor data from transformed sensor data streamed to the given application during the given time period; and providing, based at least in part on said determination, the at least one transformation key to the given application during the given time period;

wherein the steps are carried out by at least one computing device.

17. The method of claim 16, wherein identifying the one or more applications associated with the at least one user device comprises identifying the given application responsive to installation of the given application on the at least one user device.

18. The method of claim 16, wherein extracting the description of the given application comprises obtaining image and textual metadata associated with the given application.

19. The method of claim 16, wherein generating the set of permitted activities is further based on user input of one or more permitted activities for the given application.

\* \* \* \* \*